(12) United States Patent
Weiss et al.

(10) Patent No.: US 7,883,149 B1
(45) Date of Patent: Feb. 8, 2011

(54) MULTIPLE PERSON VEHICLE CAR SEATS

(76) Inventors: Isaac Weiss, 431 Marcy Ave Apt. 5B, Brooklyn, NY (US) 11206; Simcha Engel, 928 61st St., Brooklyn, NY (US) 11219; Louis Herzberg, 3 Cloverdale La., Monsey, NY (US) 10952

( * ) Notice: Subject to any disclaimer, the term of this patent is extended or adjusted under 35 U.S.C. 154(b) by 0 days.

(21) Appl. No.: 12/701,186

(22) Filed: Feb. 5, 2010

Related U.S. Application Data

(60) Provisional application No. 61/266,429, filed on Dec. 3, 2009.

(51) Int. Cl.
  *A47D 1/10* (2006.01)
(52) U.S. Cl. .............. 297/256.16; 297/250.1; 297/248
(58) Field of Classification Search ........... 297/248, 297/250.1, 256.16
  See application file for complete search history.

(56) References Cited

U.S. PATENT DOCUMENTS

| | | | | | |
|---|---|---|---|---|---|
| D276,764 S | * | 12/1984 | Shipman et al. | ............. | D6/338 |
| 4,718,717 A | * | 1/1988 | Cruz | .................. | 297/135 |
| 5,033,761 A | * | 7/1991 | Kelly | .................. | 297/248 X |
| 5,344,212 A | * | 9/1994 | Muller et al. | ........... | 297/250.1 |
| 5,518,293 A | * | 5/1996 | Coy et al. | ................ | 297/248 |
| 5,845,876 A | * | 12/1998 | Zach, Sr. | ............ | 297/256.16 X |
| 5,997,085 A | * | 12/1999 | MacLiver | ................ | 297/248 |
| D422,798 S | * | 4/2000 | Holland | .................. | D6/338 |
| 6,070,936 A | * | 6/2000 | Holland | .................. | 297/232 |
| 6,250,653 B1 | * | 6/2001 | Worrell | .................. | 280/47.38 |
| 6,260,903 B1 | * | 7/2001 | von der Heyde | ........ | 297/248 X |
| 7,344,193 B1 | * | 3/2008 | Carrier et al. | .............. | 297/248 |
| 7,407,226 B2 | * | 8/2008 | Macliver | ................ | 297/248 X |
| 7,794,015 B1 | * | 9/2010 | Ashby | .............. | 297/250.1 X |
| 2006/0163921 A1 | * | 7/2006 | Macliver | ................ | 297/248 |
| 2007/0108812 A1 | * | 5/2007 | Haun et al. | ................ | 297/248 |

\* cited by examiner

*Primary Examiner*—Rodney B White
(74) *Attorney, Agent, or Firm*—Louis P. Herzberg

(57) ABSTRACT

Apparatus for multiple person vehicle seats, specialized car seats, modular car seat systems, dual person car seats, and overlapping car seats, for use in a land, sea or air vehicle, mounted onto the vehicle's built-in seat and used for securing a car seat user, such as a small child, within a vehicle's regular seating positions. Car seat systems include components enabling addition or removal of seating positions for a desired number of car seat users as needed, limited only by available width space of the vehicle seat onto which it is mounted. Car seat systems and/or multiple person car seats generally provide more and/or specialized seating positions for persons in car seats than provided for regular passengers in the vehicle width space taken up by the car seat systems or the multiple person car seat.

61 Claims, 10 Drawing Sheets

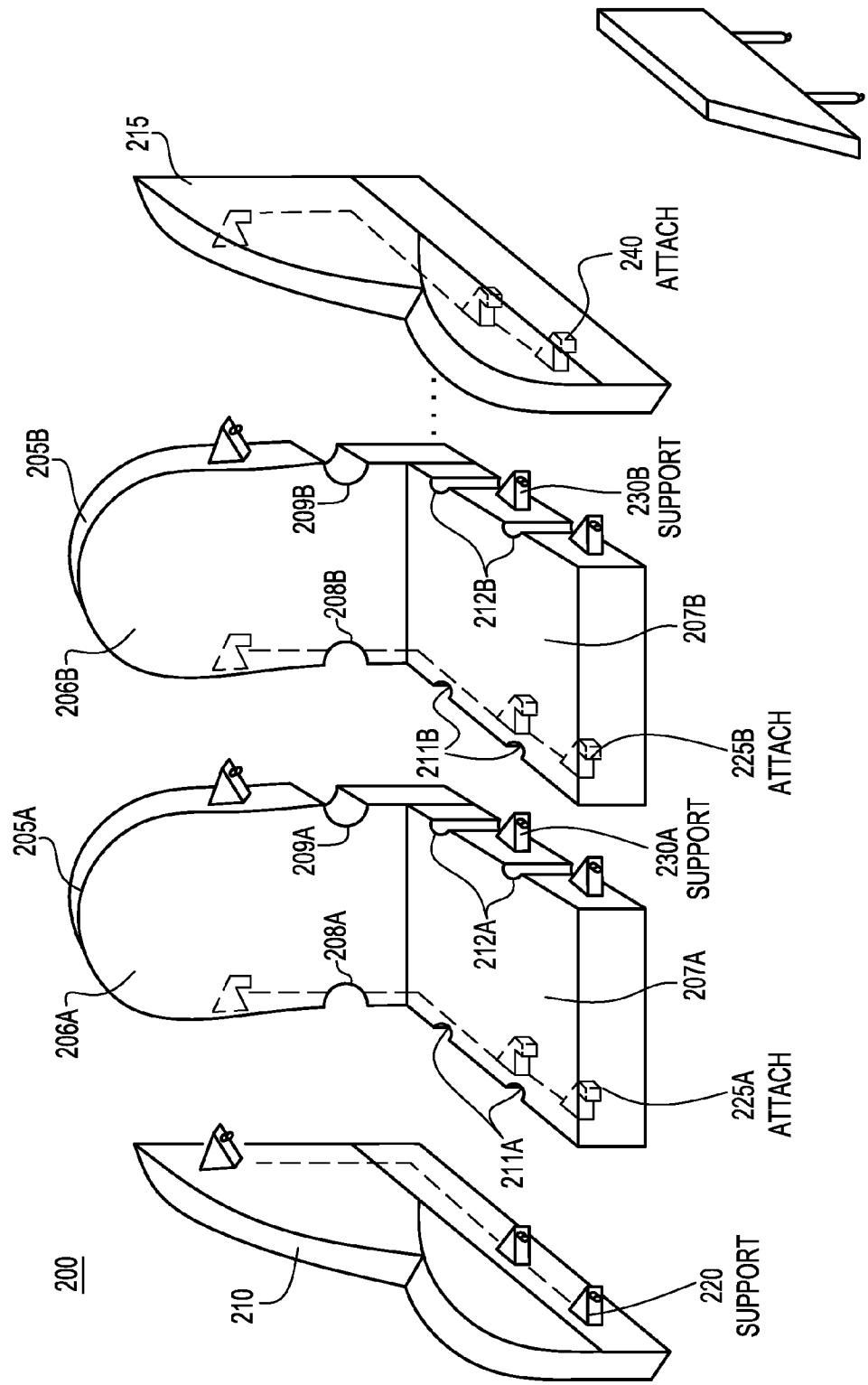

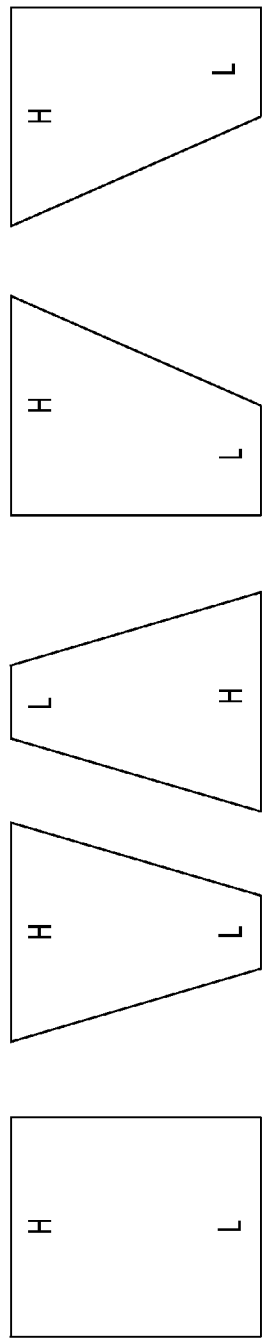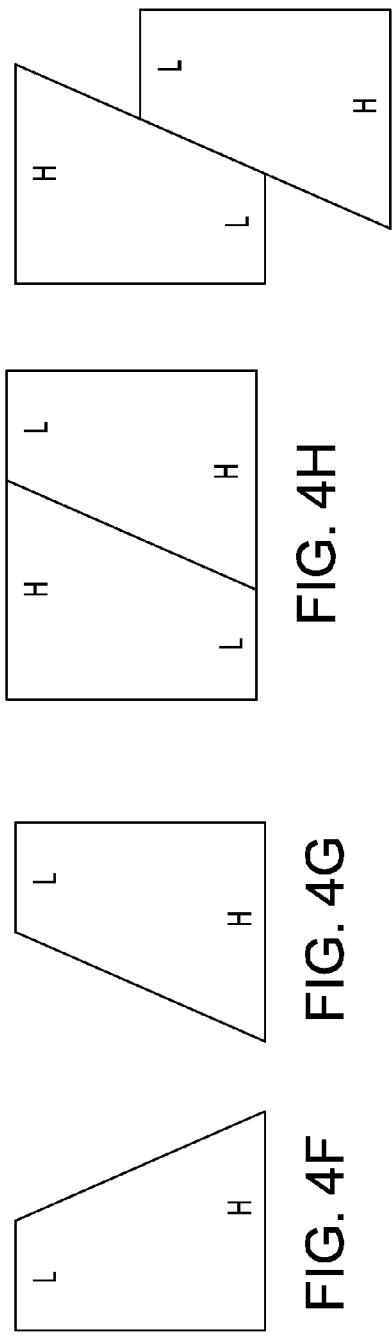

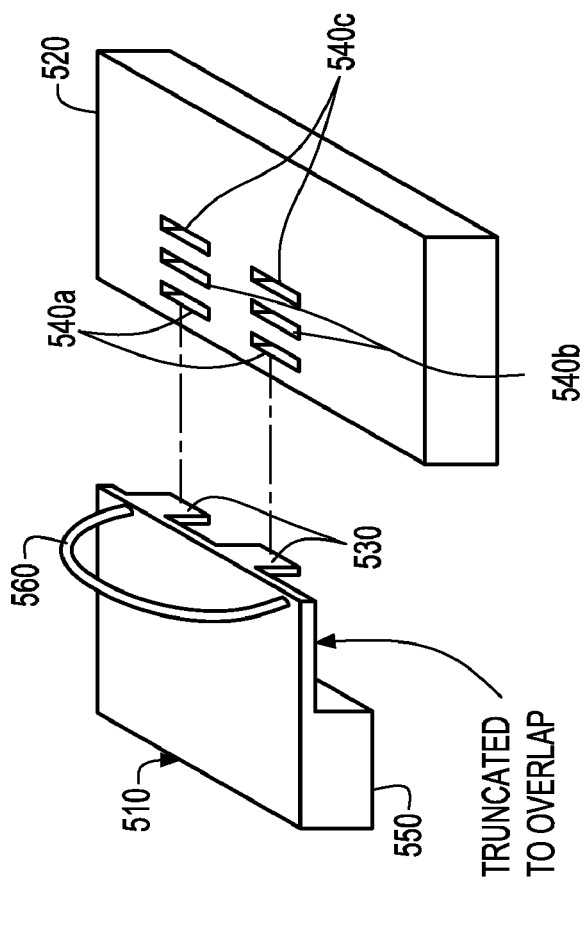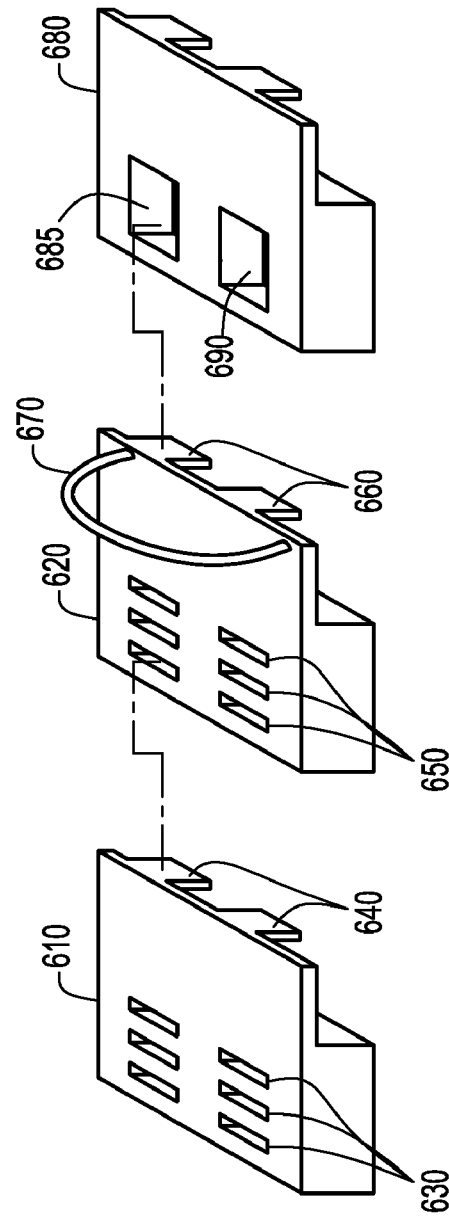
FIG. 5
FIG. 6

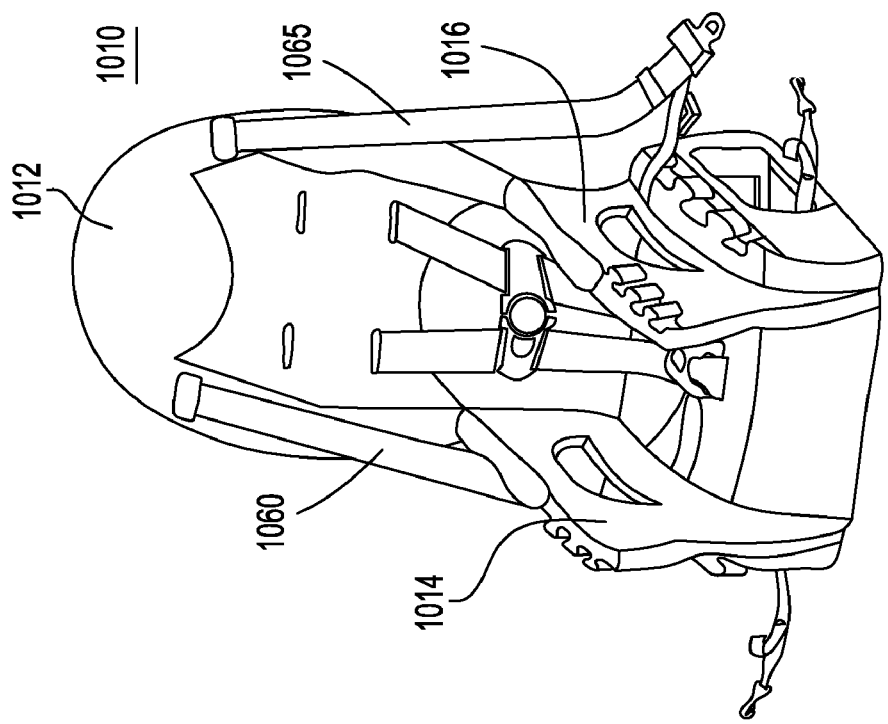
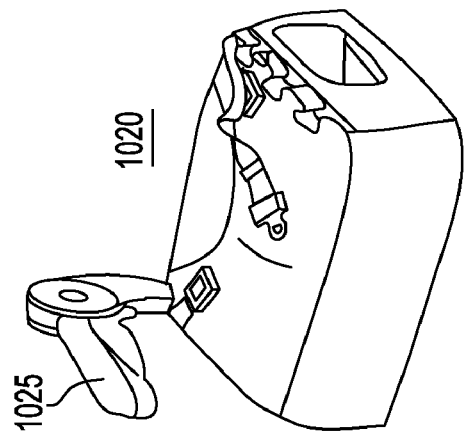
FIG. 10B
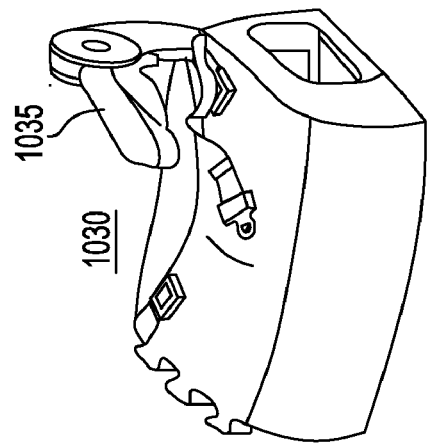
FIG. 10C
FIG. 10A

MULTIPLE PERSON VEHICLE CAR SEATS

PRIORITY

This application claims priority from U.S. Provisional Application Ser. No. 61/266,429, filed Dec. 3, 2009, entitled "Multiple Person Car Seat".

FIELD OF THE INVENTION

The present invention relates to apparatus and methods for multiple person vehicle car seats and specialized car seats. More particularly, but not exclusively, it relates to apparatus and methods for a car seat system, a dual person car seat, overlapping car seats and a multiple person car seat.

BACKGROUND OF THE INVENTION

The present invention is concerned with special vehicle seats. Heretofore, each vehicle car seat was a small removable seat generally equipped with a restraining device or harness and can be fastened to the seat of a vehicle for securing a person in the vehicle. Most often it is a seat that is portable for use in the automobile and fastens onto a car's built-in seat and is used for securing a small child in a car's regular seating position. The seat is removable and is designed to hold the small child safely while riding in the automobile and attaches to a standard seat with hooks or straps and detaches from the standard seat by unhooking the hooks and straps. As referred to herein, the term 'car seat' includes a 'car booster seat', generally used for a child who has outgrown both an infant car seat and a toddler car seat and lifts the child by several inches. As with an infant car seat, a booster seat is placed on a vehicle adult seat and is designed to restrain the child in the booster seat employing the built-in adult seat belt of the vehicle. A booster seat is generally recommended for children from 40 to 80 pounds. Many booster seats are designed without a back and the child seated on it is lifted by several inches and restrained employing an adult built-in seat belt.

Herein, a person using and/or needing a car seat is referred to as a car seat user. Also, although reference is made to infants, toddlers and/or children, this invention is applicable to any car seat user that uses and/or needs a car seat when traveling in a land, sea or air vehicle. Thus the term 'car seat' is used for a removable vehicle seat generally equipped with a restraining device or harness and can be fastened to the seat of a vehicle for securing a person in the vehicle.

It is noted that when seating is required for a plurality of car seat users, a separate car seat is needed for each car seat user. Thus each car seat user uses up a separate regular seat built into the vehicle. Thus a family or group including a plurality of children and/or other car seat users is limited in seating capacity by the adult seating capacity of the vehicle being used. This limitation manifests itself as a serious problem for large families and/or groups that find it difficult to meet children car seat needs for all their children or to meet the needs of car seat users of the group. These families must either not meet car seating requirements or leave one or more children out of the vehicle. It would be advantageous to find a way to better utilize the adult seating capacity in a vehicle to provide more seating for persons in car seats than is provided by the vehicle's adult seating capacity. Besides cars, this may be particularly useful in vans, buses or other land, water or air vehicles.

DEFINITION OF TERMS

For purposes of this invention:
the term 'person' is used for anyone whether the person be an infant or an aged senior;
the term 'adult seat belt' is a seat belt built-in to a vehicle for use by an adult passenger;
the term 'car seat right side' is used to refer to a car seat dimension running along a right hand side, head to foot, of a person using the car seat when the person is seated in the manner known for an ordinary car seat;
the term 'car seat left side' is used to refer to a car seat dimension running along a left hand side, head to foot, of a person using the car seat when the person is seated in the manner known for an ordinary car seat;
the term vehicle is used to include any land air or water vehicle;
the term vehicle 'space width', 'width space' or 'width' is used for the seat space allocated to a passenger of the vehicle from the passenger's right hand to the passenger's left hand;
the term 'vehicle seat' is a seat in a vehicle which provides seating for one or more regular passengers;
the term 'vehicle rear' refers to the end of the car closest to the rear tires;
the term 'vehicle front' refers to the end of the car closest to the front tires;
the term 'car seat user' refers to any person using and/or needing a car seat;
the term 'car seat person' refers to any person using and/or needing a car seat;
the term 'adult seat' refers to a regular seating position in the vehicle designed to seat an adult;
the term 'booster seat' is a seat that can be placed on a vehicle seat, for seating a child who has outgrown both an infant car seat and a toddler car seat and lifts the child by several inches, and is designed to restrain the child employing an adult seat belt; and
the term 'regular passenger' refers to a vehicle passenger such as an adult not requiring seating in a car seat.

SUMMARY OF THE INVENTION

It is therefore an object of the invention to obviate and/or mitigate disadvantages associated with the use of heretofore conventional car seats in vehicles carrying a plurality of persons needing use of a car seat when seated in a vehicle.

In a first aspect of the present invention a novel multiple person car seat is provided. The multiple person car seat is such as to provide more proper sitting positions in a vehicle than are provided by the vehicle capacity for persons not in a car seat. Thus, vehicle passenger space widths that are provided for 1, 2, 3 or 4 passengers are used to provide, 2, 3, 4, 5 or more persons respectively, in a multiple person car seat as described below.

In some embodiments of a multiple person car seat, the multiple person car seat uses similar or even greater car width space for car seat users than it takes up for regular the car seat users. In these cases it generally provides more room and comfort advantages than a multiplicity of individual car seats.

In a second aspect of the present invention there is provided a car seat system. The car seat system is modular to enable provision of a desired number of seats for car seat users that are needed and/or fit in the vehicle car seat in which it is incorporated.

In a particular embodiment, the car seat system includes a first car seat right end, a first car seat left end, and a first car seat center. The first car seat center includes a first car seat back, a first car seat base. The first car seat right end includes a support mechanism, designed to accept an attachment mechanism of the right periphery of the first car seat center. The left periphery of the first car seat center includes a support mechanism to accept an attachment mechanism of the first car seat left end when the system is used for a single person. When the car seat system is used for two persons, the support mechanism of the left periphery of the first car seat center accepts an attachment mechanism of a second car seat right end. When the car seat system is used for three persons, the support mechanism of the left periphery of the second car seat center accepts an attachment mechanism of a third car seat right end, and so on. The support mechanism of the left most car seat center accepts an attachment mechanism of the first car seat right end. In some embodiments car seat centers are divided by a separator. The number of car seat centers in a car seat system is limited by the vehicle seat width made available to the car seat system. The car seat system employs at least one adult seat belt male and female connector combination of the vehicle.

In another aspect of the present invention, in a particular embodiment the second car seat center also employs a seat belt of the vehicle. In some cases this may be the same seat belt employed by the first car seat. In some cases this requires use of a seat belt extender to properly restrain the first and second car seats. In some cases there is provided a special seat belt for each car seat to restrain the person in that car seat.

In a further aspect of the present invention, the first and second car seats centers are designed such that when attached together by the support and attachment mechanisms the combined attach seats with car seat right and left ends use a vehicle seat width generally allocated to a single vehicle passenger.

In another aspect of the present invention, the first car seat is designed for a person to face the back of the adult seat and the second car seat is designed for a person to face the front of the adult seat so that the car seat users face each other. The users sit face-to-face. Preferably, each car seat is designed such that the portion of the car seat holding the main body of the person in the seat is wider than the portion of the car seat provided for the legs of the person in that seat. In this way car seat centers have overlapping base portions so as to use a lesser amount of total vehicle seat width space. In general the second car seat center has a second support mechanism to accept a second attachment mechanism of a third car seat center. When the second attachment is coupled to the second support mechanism the second car seat center is in-between the first car seat and third car seat centers.

It is preferable that the vehicle width taken up by the three seat combination [when both car seat 2 and car seat 3 are attached to car seat 1] is no more than the width space taken up by two adjacent adult passenger seats seating two persons without a car seat. In some embodiments, the seating directions of adjacent car seats have the car seat persons facing each other.

It is preferable that both car seat 2 and car seat 3 be designed so that when a person in car seat 2 faces the front of the vehicle seat, the persons in car seats 1 and 3 face the back of the vehicle seat, and when the person in car seat 2 faces the back of the vehicle seat, the persons in car seats 1 and 3 face the front of the vehicle seat.

In a further aspect this invention includes a multiple person car seat. The multiple person car seat is generally designed to provide more seating positions in the vehicle for persons in the multiple person car seat than would be available for persons not in the multiple person car seat.

A two person multiple person car seat is preferably designed to use a vehicle width generally allocated for a single passenger. Three and four multiple person car seats are preferably designed to use a vehicle width allocated for two vehicle passengers not seated in a car seat.

A four or five multiple person car seat is preferably designed to take up a vehicle width allocated for three passengers not seated in a car seat, and so on. Generally, in each design a multiple person car seat generally provides more seating for car seat users than is provided by the vehicle for adult non car seat users, but not in all cases.

In some embodiments, the number of car seat users provided for by the multiple person car seat and/or car seat system is equal to the number of adult car seat users in the same vehicle space width.

As stated, it is preferable that the multiple person car seat be designed such that the seating position of adjacent seats face opposite ends of the vehicle seat. For example, a four person multiple person car seat having seating for a first, second, third and fourth person would provide seating of the first and third persons to face the front of the vehicle car seat, and the seating of the second and fourth persons to face the rear of the vehicle car seat or vice versa. In each case it is preferable that each seating position provides more vehicle width for the body of the person using that seating position than it provides for the leg of that person. This would result in better utilization of the vehicle width space, and would enable more passengers in the vehicle than the vehicle width space allows without the multiple person car seat. The same applies to the car seat system described herein.

Each multiple person car seat generally employs at least a vehicle seat belt to fasten the multiple person car seat to the vehicle. In some cases a seat belt extender is employed together with the vehicle seat belt(s). It is preferable that each seating position have a restraining belt to hold the person in that seating position.

In a further aspect of this invention, in some embodiments adjacent car seats portions are mountable adjustably to use up width not taken by a person in an adjacent car seat portion. Thus, a base of a second car seat uses up a portion of a car seat width available to a first car seat base that is not taken up by a car seat person in the first car seat base of an adjacent car seat. A portion of the second car seat base overlaps a portion of the adjacent first car seat base.

In a still further aspect of the present invention, still more efficient use of vehicle car seat width space is achieved in embodiments having two car seats with users facing each other being seated essentially in a same width space. In these cases two car seats users take up a common portion of vehicle width space that is ordinarily used for a single car seat user. This type of a car seat is herein referred to as a car seat entity for one or more 'dual person car seats'. A 'dual person car seat' can be used as a standalone car seat, a portion of a 'multiple person car seat', or as a component of a car seat system.

BRIEF DESCRIPTION OF THE DRAWINGS

The foregoing and further features of the present invention will be more readily understood from the following description of advantageous embodiments, by way of example only, with reference to the accompanying [not to scale] drawings, in which:

FIG. 2 is a schematic diagram of car seat system in accordance with the present invention;

FIG. 3 is a schematic diagram of a car seat center separator in accordance with the invention;

FIGS. 4A-4J show diagrams of examples of different seat base designs and different seat base combinations in accordance with the invention;

FIG. 5 shows a diagram of an embodiment of adjacent car seats portions are mountable adjustably to enable another car seat user to use up width not taken by a person in an adjacent car seat portion in accordance with the present invention;

FIG. 6 shows car seat bases which have both receiving holes and wing inserts in accordance with the present invention;

FIG. 10A, 10B and 10C show an example of removably attachable car seats in a car seat system for 3 car seat persons;

DESCRIPTION OF THE INVENTION

Figure 1A:
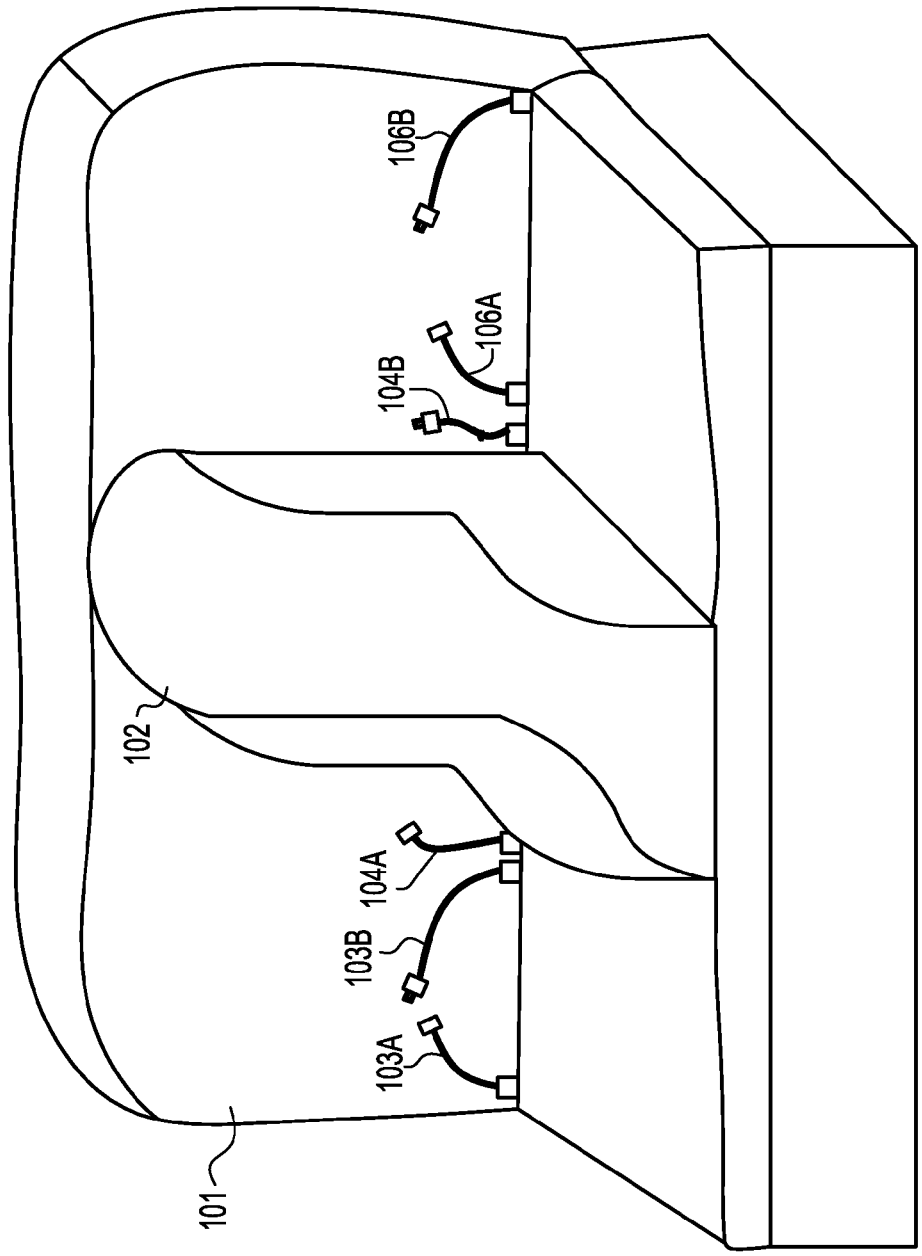
FIG. 1A is a diagram of a prior art basic car seat positioned in a vehicle adult seat, a vehicle seat for three adults.

The present invention obviates and/or mitigates disadvantages associated with known vehicle car seats. Heretofore, all known car seats provided car seat seating for a single person. Each car seat used-up the vehicle space width allocated to an adult seat. This is disadvantageous to large families or groups that include a plurality of persons needing use of a car seat when seated in a vehicle. This invention provides for car seat systems and/or multiple person car seats that provide more seating positions for persons in a car seat than provided for adults in the car width taken up by the car seats, and/or better seating for car seat users, especially for seating multiple car seat persons in a vehicle.

In general, the car seats systems and/or multiple person car seats of the present invention generally may provide any or all of the amenities of previously known car seats. The present invention is thus useable to provide features and general aspects of standard prior and developing car seat technology. It is upon this technology that the present invention is providing special features described herein.

In the following the words 'right' and 'left' are used to facilitate understanding of embodiments presented herein. This is not to be considered a needed limitation, and 'right' and 'left' may be interchanged in accordance with a particular implementation. The particular implementations are only exemplary enablements, in so much that the concepts and advantages may be achieved by other implementations which are also deemed to be included and protected by the claims of this invention.

In a first embodiment, the present invention provides novel vehicle seating systems. A car seat system is modular to enable provision of the number of seats for car seat users that fit in the vehicle car seat in which it is incorporated. This enables purchasers to purchase that portion needed at a particular time. Additional or replacement portions of the system may be purchased for example as a family size increases.

The novel car seat systems are generally such as to provide more proper sitting positions in a vehicle than are provided by the vehicle for persons not in a car seat. Thus, vehicle passenger space widths that are provided for 1, 2, 3 or 4 passengers are used to provide, 2, 3, 4, 5 or more persons in a multiple person car seat as described in this description. This overcomes problems with the present state of the art of using a car seat to provide seating for example an infant or a child within the same car width provided for an adult passenger. There are many large families, or family groups traveling together in one vehicle for whom the one-to-one passenger space width allocation does not provide sufficient safe and proper seating for the entire family and/or group.

In some embodiments multiple person car seat provides for seating of the same number of car seat users as provided for regular seat users without the adjacent walls inherent to two or three prior art adjacent car seats. In some embodiments a separator is provided between adjacent car seat portions to provide some separation of adjacent car seat persons.

FIG. 1A, shows a basic prior art car seat 101 in a center adult seating position of a typical vehicle seat 102 for seating three adults. Car seats are made in many different ways. Many of these are known to those in the art. The seating portion 102 shown in FIG. 1A is purposely shown for its simplicity without any of the many features of some currently available car seats, in as much that these are generally not of particular concern to the present invention. Vehicle seat 101 includes seat belt pairs 103A 103B, 104A 104B and 106A 106B. Pair 104A 104B is used to mount car seat 102 into vehicle seat 101. The seat is non-modular and provides seating for one car seat user.

Figure 1B:
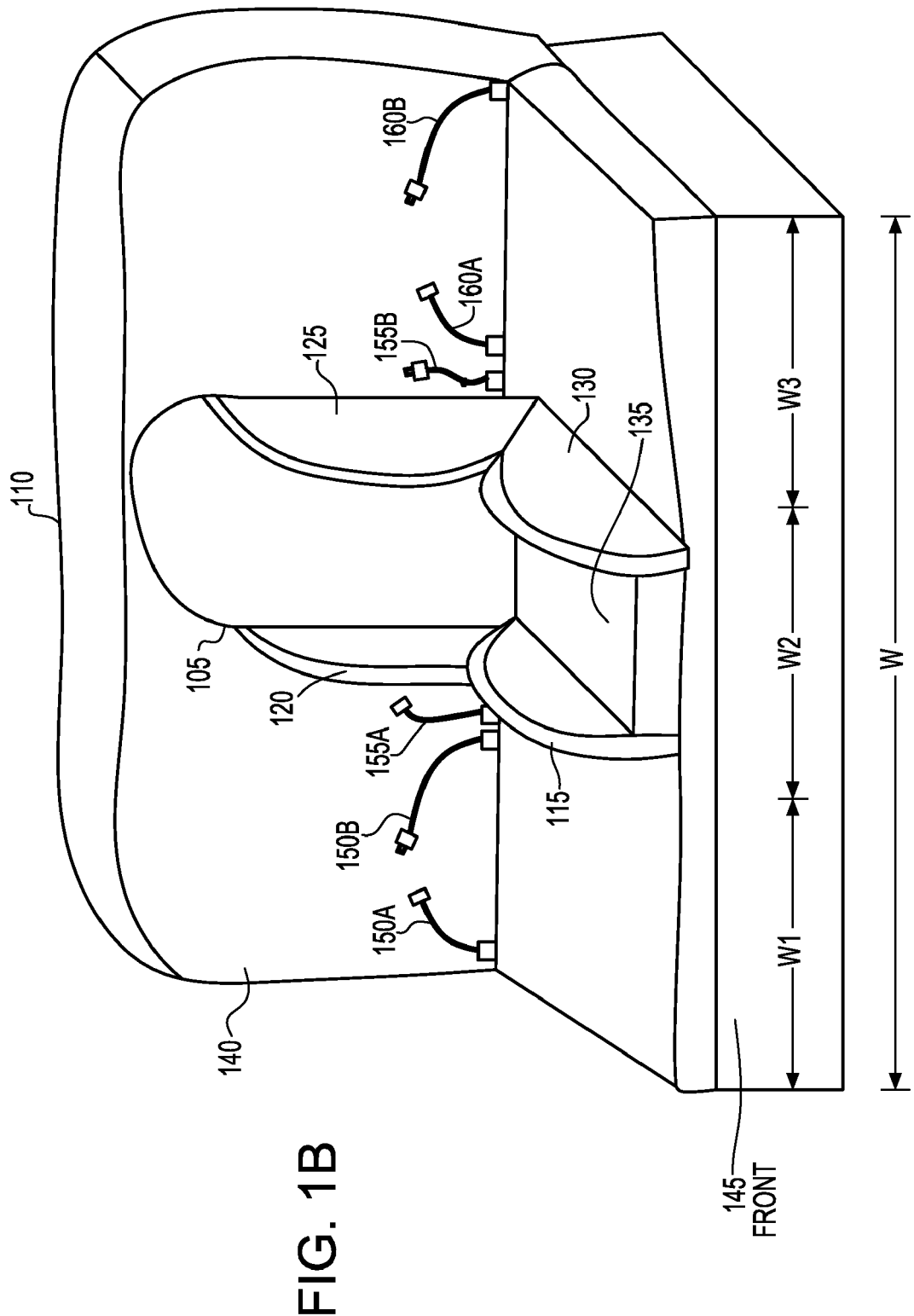
FIG. 1B is a diagram of a modular one person car seat in accordance with the present invention.

FIG. 1B shows a car seat which heretofore would be an integral unit to provide seating for one car seat user. It is herein broken down into components in a manner suitable for the description of a modularized car seat, and provides a basis and convenient starting point for a car seat format upon which this invention may be easily implemented and described. It is noted that this is only exemplary and other one person car seats may be likewise be used.

In FIG. 1B, car seat 110 has a car seat back 115 a right hand vertical side 120, a left hand vertical side 125, a right hand horizontal side 115, a left hand horizontal side 130 and a car seat base 135. The vehicle seat 110 has a vehicle seat back 140, a vehicle seat front 145, a right hand seat belt pair 150A, 150B, a center seat belt pair 155A, 155B, and a left seat belt pair 160A, 160B. Each seat belt pair includes a seat belt male connector, and a seat belt female connector that when connected together restrain the person or car seat included between the seat belt pair and the vehicle seat back 140. This car seat 105 is typically restrained by seat belt pair 155a, 155b.

Each of the three seating positions in vehicle seat 110 generally takes up one third of the entire seating width shown as 'W1', 'W2' or 'W3'. Generally, car seat 105 takes up at least one entire seating width, 'W2'. If a second car seat was used it would take up the width 'W1' or 'W3'. A third car seat when used would take up the width 'W3' or 'W1' whichever is not used for the first and second car seats. In some cases a car seat is designed with extra side cushioning and apparatus that takes up more than an adult seat width such that a vehicle having a vehicle seat designed for three adults fails to provide space width for three separate car seats. This invention overcomes this problem and provides more seating for car seat users than provided for adult passengers in a vehicle seat.

Although the portions of the car seat in FIG. 1B may be parts of an integral car seat, these portions are henceforth to be considered herein as separate components of a modularized car seat.

In a first aspect of the present invention there is provided a first car seat center 205A shown in FIG. 2, which is a component of a car seat system 200. The car seat system 200 generally employs at least one seat belt of the vehicle. The first car seat system 200 may include a right side car seat end 210, the first car seat center 205A, and a left side car seat end 215. In some embodiments no car seat end or only one car seat end is used. When desired or necessary, this is particularly useful when a car seat center is used between either regular car seats, when the car seat person is not yet ready for a booster seat, when the car seat center is adjacent to a vehicle door or vehicle wall, or when other side support means are available. Some booster seats have upwardly curled sides and/or upwardly curled backs. The backs generally are of minimal height. Some car seat centers have outwardly curled sides to provide support for the car seat person that sits in it.

The right side car seat end 210 includes a car seat support mechanism 220 that is designed to mate with a right side attachment mechanism 225A on first car seat center 205A. The left side car seat end 215 has a left side attachment mechanism 235 that is designed to mate with a left side support mechanism 230A of first car seat 205A. When the car seat system is used as a single car seat, it includes first car seat center 205A, right side car seat end 210 and left side car seat end 215.

Car seat center 205A is generally formed to have a car seat back 206A and a car seat base 207A. In some embodiments car seat back 206A and car seat base 207A are made as an integral unit. Car seat back 206A has indentations 208A and 209A that may be used to accept at least one belt of a vehicle belt pair of the vehicle upon which it is mounted. Car seat center 205A often includes a car seat center belt and/or harness (not shown) to restrain a person seated in car seat center 205A. Car seat base 207A often has two indentations 211A on its right side and two indentations 212A on its left side. Indentation 211A and 212A are made to accept a car seat separator 310 shown in FIG. 3, when a separator is used.

When a car seat separator 310 is used it provides some physical separation between persons sitting in adjacent car seat centers. Car seat separators 211A and/or 212A are used for car seat centers that are adjacent and attached to each other. Indentations 211A need not be used when car seat center 205A is attached or is integral to right side car seat end 210. In a preferred embodiment right side car seat end 210 and first car seat center 205A are formed to be an integral unit.

The car seat system 200 is made to be two person car seat by connecting a second car seat center 205B between first car seat enter 205A and [another car seat not shown or to] left side car seat end 215. As shown in FIG. 2, car seat centers are said to be attached side to side to each other in the position relationship shown for car seat centers 206A and 206B. Sometimes the left side car seat end 215 and car seat 205B are formed to be an integral unit. Left side car seat end 215 includes a left side car seat end 215 attachment mechanism 240 to attach to an adjacent support mechanism.

Second car seat center 205B is generally formed to have a second car seat back 206B and a second car seat base 207B. In some embodiments second car seat back 206B and second car seat base 207B are made as an integral unit. Second car seat back 206B may have indentations 208B and 209B that are used to accept at least one belt of a vehicle belt pair of the vehicle upon which it is mounted.

Second car seat center 205B includes a second car seat attachment mechanism 225B that is designed to mate with support mechanism 230A of first car seat 205A. Second car seat center 205B has a second car seat support mechanism 230B that is designed to mate with another attachment mechanism. Car seat center 206B often includes a car seat center belt and/or harness (not shown) to restrain a person seated in car seat center 205B. Car seat base 207B often has two indentations 211B on its right side and two indentations 212B on its left side. Indentation 211B and 212B are made to accept a car seat separator 310 shown in FIG. 3. Car seat separator 310 is used, when desired, to provide a physical separator between persons setting in adjacent car seat centers. Car seat indentations 211B and/or 212B are used for car seat centers that are adjacent and attached to each other. Indentations 212B need not be used when car seat center 205B is attached or is integral to left side car seat end 215.

In similar fashion the car seat system 200 becomes a three person car seat by connecting another car seat center [not shown] between second car seat center 205B and left side car seat end 215. As stated above, in a preferred embodiment left side car seat end 215 is formed to be an integral unit with second car seat center 205B, and so on. In this case the car seat system 200 is made into a three person car seat by inserting another car seat between the first car seat center 205A and the second seat center 205B, and so on.

Generally, the car seat ends and centers are designed to use less vehicle seat 'space width' than the seat width allotted to an adult seat for each car seat user seating. It is preferable that when the car seat system 200 provides seating for two persons its total use of vehicle seat width be not much more than used by a single adult seat. In this way when the two seat car seat system is mounted in a vehicle seat designed for two adult passengers, it leaves room for an adult passenger even after it is mounted in the vehicle seat. Similarly, when the two seat car seat system is used in a vehicle seat designed for three adult passengers, it leaves room for two adult passengers.

As shown in FIG. 2, car seat centers are attached side to side. Each car seat center is herein referred to as having a first side and a second side. For example, car seat center 205A has a first side having indentations 211A and a second side having indentations 212A.

Car seat center 205B has a first side having indentations 211B and a second side having indentations 212B. The first side of car seat center 205A is attached to right side car seat end 210. The second side of car seat center 205A is attached to the first side of car seat center 205B. The second side of car seat center 205B is attached to the first side of another car seat center (not shown), or to left side end 215. End 210 is sometimes referred to as being a first side end. End 215 is sometimes referred to as being a second side end.

Other embodiments have other implementations than the method shown in the present figures for meeting concepts satisfied by the indentations, separator, support and attachment mechanisms according to car system designs. Some of these are not always used. Also, the support and attachment mechanisms need not be the same for all car seat centers and car seat ends. This depends on the car seat system design. These mechanisms need not be on the sides of the car seat centers as shown in FIG. 2. The attachment and support mechanisms need only be compatible with each other and serve the application and specific design actually implemented. Some mechanisms include a spring loaded pin manually or mechanically coupled and decoupled from capturing or non-capturing pin inserts.

Generally, car seats are variously designed wherein the person in the car seat faces either the front or rear of the vehicle car seat. Thus although the above described car seat system shown in FIG. 2, indicated the car seat person is facing the front of the vehicle seat; it is also adaptable to embodiments wherein the car seat person faces the back of the vehicle seat. In also these implementations the support and attachment mechanism operate cooperatively to provide proper attachment of the second car seat to the first car seat, the third car seat to the second car seat, and so on.

Car seat centers are designed to couple car seat centers together using a compatible pair of support mechanism and attachment mechanisms. Attachment mechanisms are designed to mate with a support mechanism. Mechanisms variously employ pins, sliding, connecting, mechanical, magnetic and/or electrical means. Although these mechanism are shown in FIG. 2 to be in both the backs and bases of car seat centers, these or other mechanisms may be used to couple car seats and/or car seat centers together in only the back, the base or any other useful manner. For example, a car seat center for a booster seat would generally only have a base with or without a reduced back. Some, mechanisms are used to accommodate attachment and/or coupling of face to face car seat centers, such that car seat persons in adjacent car seat centers face each other.

In some embodiments of the present invention, the second, third, and/or fourth car seat centers also employ a seat belt of the vehicle. In some cases this may be the same seat belt employed by the first car seat. In some cases this requires use of a seat belt extender to properly restrain the first, second and third car seats. In some cases there is further provided a special seat belt and/or harness for each car seat to restrain the person in that car seat center.

As previously stated, it is known in the art that car seats are designed that have the car seat person in the car seat to face the front of the car vehicle seat, whereas others car seats are designed that have the car seat person in the car seat to face the rear of the car vehicle seat. This variation is particularly useful in the present invention, which provides for seating of car seat persons face-to-face, where at least one card seat person faces the front of the car vehicle seat, whereas at least one others car seat person faces the rear of the vehicle seat.

In a particular aspect of the present invention, the first and second car seat centers are designed such that when attached together by the support and attachment mechanisms the combined attach seats use a vehicle seat width generally allocated to a single vehicle passenger.

Consideration is now directed to design of the car seat base, 207A, and 207B of FIG. 2. This maybe implemented such as to result in better usage of car vehicle seat width. FIG. 4 shows top views of car seat bases for several different cases. FIG. 4A shows a generally rectangular car seat base. This is generally for a car seat system in which all the car seat users face a same frontward or rearward vehicle seat direction, and the same width is provided in the base car seat for the car seat user's head-ward direction 'H', and the leg-ward direction 'L' direction.

FIGS. 4B & 4C show trapezoidal car seat bases in which less car width is provided for the car seat user's legs 'L', than is provided for the car seat user's head direction 'H'. In this way the car seat system may employ less overall vehicle seat width space. It is preferred that car seat bases 4B & 4C be used in combination as shown in FIGS. 4H and 4L. Trapezoidal car seat bases 4B & 4C are also used advantageously for using car seat centers that are adjacent to an adult seat; in so much that the car seat system may provide additional leg or head-ward room for the adult in the adjacent position.

It is advantageous to implement the car seat system in which car seat bases 4B and 4C are used alternately. In some embodiments, a first car seat center uses modified trapezoidal car seat bases 4D or 4F and/or at least one car seat center uses modified trapezoidal car seat base 4E or 4G. Alternating different car seat bases may advantageously be employed with bases being inline with each other as in 4H, or by off-setting the car seat bases as in 4I. Extra wide base 4J is used to provide extra width space for a car seat user needing extra width space, for example as is needed for an obese child or handicapped car seat user. In all these cases, the car seat center is designed to be compatible with the car seat base used. When the car seat base is for a booster seat, the car seat center back is often minimized or not used.

Generally, when a seating position of a car seat system is allocated to a booster seat the car seat center has no car seat back. In some implementations a car seat system combines car seat centers with and without backs. The back of a person using a booster seat would generally be on the vehicle seat back and facing the seat front to allow the booster seat user to dangle his/her legs. A person sitting adjacent to the booster seat person would advantageously be placed on a seat base facing the seat back. Booster seat users may also be placed adjacent to each other using seat bases as appropriate to that seating.

Preferably, each car seat is designed such that the portion of the car seat holding the main body of the person in the seat is wider than the portion of the car seat provided for the legs of the person in the seat. Preferred variations provide that when a first car seat center is a booster seat, the second car seat is an infant seat.

In a further aspect the first car seat has a second support mechanism to accept a second attachment mechanism of a third car seat. When the second attachment is coupled to the second support mechanism the second car seat is on one side of the first car seat and third car seat is on the other side of the first car seat.

It is preferable that the vehicle width taken up by the three seat combination (when both car seat 2 and car seat 3 are attached to car seat) is less than the width of 2 adjacent passenger seats seating persons without a car seat.

It is preferable that both car seat 2 and car seat 3 be designed so that when a person in car seat 1 faces the front of the vehicle, the persons in car seats 2 and 3 face the back of the vehicle, and when the person in car seat 1 faces the back of the vehicle, the persons in car seats 2 and 3 face the front of the vehicle.

In a further aspect this invention includes a multiple person car seat. The multiple person car seat is designed that it provides more seating positions in the vehicle for persons in the multiple person car seat than would be available for persons not in a car seat. A two person car seat is preferably designed to use a vehicle width allocated for a passenger with generally provided for a single passenger. Three and four multiple person car seats are preferable designed to use a vehicle width allocated for two vehicle passengers not seated in a car seat. A four or five multiple person car seat is preferable designed to take up a vehicle width allocated for three passengers not seated in a car seat, and so on. In each design of a multiple person car seat it is advantageous that the car seat provides more seats for car seat users in a seat width, than is provided by the vehicle width space for adult passengers in the vehicle seat in the vehicle.

It is preferable that the multiple person car seat be designed such that the seating position of adjacent seats face opposite ends of the vehicle seat in which it is mounted. For example, a four person having seating for a first, second, third and fourth person multiple person car seat would provide seating of the first and third persons to face the front and the second seating of the second and fourth persons facing the rear. In each case it is preferable that each seating position provides more vehicle width for the body of the person using that seating position than it provides for the leg of that person. This would result in more efficient utilization of the vehicle width space, and would enable more passengers in the vehicle than the vehicle width space allows without the multiple person car seat. This is also so for the car seat system described herein.

Each multiple person car seat employs at least a vehicle seat belt to fasten the multiple person car seat to the vehicle. In some cases a seat belt extender is employed together with the vehicle seat belt(s). It is preferable that each seating position have a restraining belt to hold a person in that seating position.

In general, multiple person car seats are designed to provide any combination of car seat centers of the described above for car seat systems.

It is noted that the support and attachment mechanism may be implemented in ways known previously for connecting two parts. This includes but is not limited to pin and insert mechanisms, sliding mechanisms, male to female mating connections, sexless connection mechanisms, etc. In some embodiments, these connections require and/or employ a connection release mechanism to disconnect attached seats or are disconnected manually. These implementations are best chosen to satisfy particular car seat implementation requirements.

In some embodiments adjacent car seats portions are mountable adjustably to use up width not taken by a person in an adjacent car seat portion. Thus, a base of a second car seat uses up a portion of a car seat width available to a first car seat base that is not taken up by a car seat person in the first car seat base of an adjacent car seat. An example of this is shown in FIG. 5.

FIG. 5 shows a car seat base 520 which has three pairs of receiving holes 540A, 540B and 540C. Each pair of receiving holes is capable of accepting a pair of wing inserts 530 of car seat base 510. Car seat base 510 has a truncated portion 550 which allows attachment of car seat base wing inserts 530 into any pair of receiving holes 540A or 540B or 540C of car seat 520. This provides adjustable mounting of truncated portion 550 upon car seat base 520. Selection among pairs of 540A, 540B or 540C depends on how much car seat width the particular car seat user in car seat 520 takes up. If the car seat user in car seat 520 is an infant, car seat base 510 can be mounted by inserting wing inserts 530 into 540C. In some embodiments, a separator 560 is also provided to separate the persons in car seat 510 from the person in car seat 520, or a person in any adjacent bases when desired.

In a still improved embodiment, there is made available car seat bases which have both receiving holes and wing inserts. An example of this is shown in FIG. 6. FIG. 6 shows improved car seat base 610 which has receiving holes 630 and also has wing inserts 640. It also shows car seat base 620 which has receiving holes 650 and wing inserts 660. In this way car seat bases 610 and 620 can be interconnected with each other in arbitrary order and also can accept or be accepted by another car seat base having either or both receiving holes and wing inserts.

In some embodiments a base type as is shown for base 680 is used. Here, the upper group of receiving holes is combined into a large hole 685 and the lower group of receiving holes is combined into a large hole 690 through which the wing inserts slide and are locked into a desired seat width. In some embodiments, a separator 670 is also provided to separate the persons in car seat base 620 from the person in car seat 680 when desired.

In general embodiments, receiving holes may be used to act as a support mechanism and insert wings may be used to act as an attachment mechanism. Actual implementations of wing inserts and/or receiving holes may use any available known interconnecting mechanism, especially those useable for support and attachment mechanisms. Other methods are also available to provide ways of implementing the seat to achieve the objectives using the concepts described herein.

Still better use of vehicle car seat width is achieved in embodiments having two car seats facing each other. In this case two car seats users take up a common portion of vehicle space width that is ordinarily used for a single car seat user. This type of a car seat is herein referred to as a car seat entity for a 'dual person car seat', seating two car seat users face to face. A 'dual person car seat' can be used as a standalone car seat or as a component of a car seat system. It can also be implemented as a component within a multiple person car seat.

Figure 7:
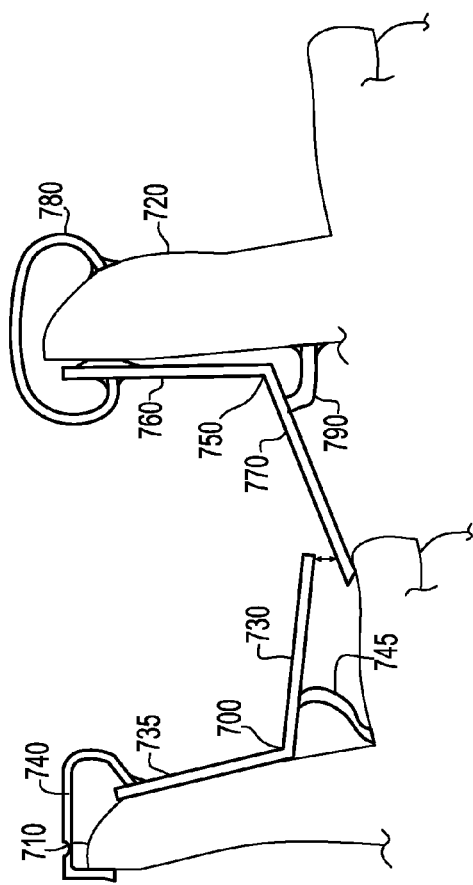
FIG. 7 shows an example embodiment of an open side view of two face to face car seat centers in a 'dual person car seat' in a common vehicle width space, in accordance with the present invention.

Multiple use of face to face car seats as in a 'dual person car seat' provides more room for seating additional car seat users in limited vehicle space width. This is possible since some vehicles are such to allow these extremely advantageous embodiments. In these vehicles there is sufficient room in front of a vehicle seat to allow car seats to be mounted face to face as shown in FIG. 7. FIG. 7 shows an example embodiment of an open side view of two car seat centers 700 and 750.

Car seat base 730 is a base of a first car seat center 700 that includes car seat back 735. Car seat base 770 is a base of a second car seat center 750 having car seat back 760. The bases 730 and 770 of these centers are mounted face to face between two vehicle seats 710 and 720. In some embodiments the base and back of the car seat centers are integral with each other. Other embodiments are also appropriate using these concepts.

In the example embodiment shown car seat 700 mounted on the front of vehicle seat 710 and is supported using supports 740 and 745. Car seat 750 is mounted at the back of vehicle seat 720 and is supported using supports 780 and 790. In the embodiment of FIG. 7, more leg room is available to a car seat user in seat 750 than is available to a user in car seat 700, thus an infant may be placed in car seat 700 and an older child in seat 750.

Figure 8:
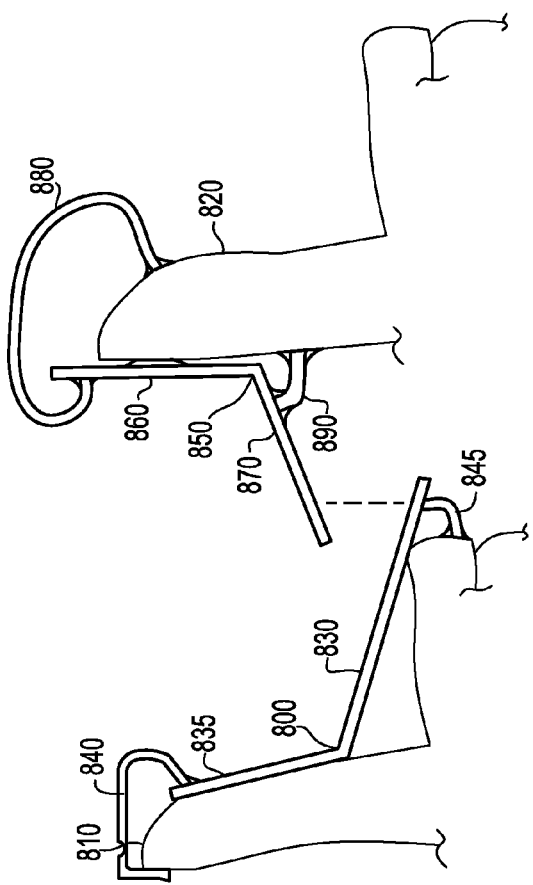
FIG. 8 shows an alternate embodiment of car seats mounted face to face car seat centers in a 'dual person car seat' in a common vehicle width space, in accordance with the present invention.

FIG. 8 shows an alternate embodiment of car seats mounted face to face. In this example embodiment car seat 800 is mounted on the front of vehicle seat 810 and is supported by supports 840 and 845. Car seat 850 is mounted on the rear of vehicle seat 820. Car seat 800 includes car seat back 835 and car seat base 830. Car seat 850 is supported by supports 880 and 890. Car seat 800 includes car seat back 835 and car seat base 830. Car seat 850 includes car seat back 860 and car seat base 870. In this embodiment more leg room is provided for a car seat user in car seat 800 than is provided to a user in car seat 850. Thus, for example, car seat 850 is best used for an infant and car seat 800 may be used by an older child. This is most advantageous when car base 830 is a booster seat allowing the child in car seat 800 to dangle his/her legs down vehicle seat 810.

In some embodiments of face to face or, the face to face car seats are mechanically connected to each other and need not make use of vehicle seat mounting. For example, these types of car seats often only need to make use of the vehicle provided adult seat belts with or without a seat belt extender. In these as with other embodiments in this application, the car seat back and the car seat base may be an integral unit. Also, these car seats may generally have at least one car seat end. In some cases the dual person car seats are formed integral with at least one end.

It was shown that it is most advantageous to design multiple person car seats to provide more room for car seat users than is available in a same width space. However, some embodiments of multiple person car seats actually provide seating space for a car seat user that essentially uses the same width space as used for regular adult passengers. These may be implemented in any of the ways described above. This is advantageous in so much that it provides features of previously known car seats with increased room for car seat persons in the multiple person car seat or car seat system. It reduces the requirements of having both left and right car seat sides for each car seat person. Car seat sides are sometimes referred to as car seat walls. Car seat sides may not always be required between car seat persons. A separator is sometimes useful between car seat persons. The separator need not be as wide as the two adjacent car seat sides it is replacing when two separate adjacent car seats are used.

For example, in some embodiments a multiple person car seat for two car seat users advantageously uses the entire width space allotted for adjacent regular passengers of a vehicle. When two separate car seats are used as heretofore required for two car seat users, each separate car seat has its own right and left side sides [walls]. There are two car seat sides [walls] adjacent to each other. A multiple car seat for the two car seat users eliminates the need for the adjacent side walls between the two car seat users. In this case the two car seat users will each have more space and comfort for a multiple person car seat or car seat system designed for two than in prior art separate car seats. If necessary or desired the two car seat users in the multiple person car seat or car seat system designed for two may include a separator between the two car seat persons. A same advantage is achieved in a multiple person car seat or car seat system designed for three etc.

In still other embodiments a multiple person car seat or car seat system designed for two or more car seat persons is embodied to provide at least one very wide car seat base for meeting special requirements of a special car seat user. Some embodiments use a combination of car seat bases that are each wider, equal to or narrower than the car space width provided for a regular passenger in a regular vehicle seat. This depends on each particular need and application.

In another aspect, the present invention includes a car seat system comprising a first car seat formed to seat a first car seat person in a vehicle seat, the vehicle seat made to provide at least one sitting position for a passenger in the vehicle. Generally, the car seat system is mounted in the vehicle seat employing a built-in seat belt of the vehicle, or uses another mounting. The first car seat has a set of first car seat components including: a first car seat center with a first car seat back, and a first car seat base that is able to be attached to the first car seat back.

In some embodiments, the first car seat provides seating for the first car seat person when the first car seat is mounted as a standalone car seat; between and in-line with or facing two regular vehicle seats; adjacent to at least one other car seat wall; or adjacent to an end of a vehicle seat. In some cases, two or more car seat centers are combined and mounted in one of these ways. In some cases car seats are combined in a way that car seat persons face one another.

As with previously described embodiments, the first car seat base can be a rectangular car seat base, a trapezoidal base, a modified trapezoidal base, an extra wide base, a base having base overlap capability, a base pair formed for a dual person car seat, a base having base overlap capability to overlap another base; or a booster seat base. In practice, any car seat base discussed herein can be one of these bases.

In some cases the car seat system includes a first side end attachable to a first side of the first car seat center, a first car seat support mechanism mounted on a second side of the first car seat center. Sometimes it includes a second car seat formed to seat a second car seat person in the vehicle seat; the second car seat includes a second car seat center attachable to the second side of the first car seat center along a first side of the second car seat center. The second car seat center includes a second car seat back, a second car seat base attachable to the second car seat back, and a second car seat attachment mechanism to couple with the first car seat support mechanism.

Sometimes it includes a second car seat end attachable to the second car seat center along a second side of the second car seat. Sometimes the second car seat is attached to the first car seat, and the second car seat attachment mechanism is coupled with the first car seat support mechanism to provide car seat seating for two car seat persons. Sometimes it includes at least one additional car seat which has an additional car seat center, each additional car seat center having, an additional car seat back, an additional car seat base attachable to the additional car seat back, an additional car seat attachment mechanism along a first side of the additional car seat center to couple with an adjacent car seat support mechanism on a second side of an adjacent car seat; an additional car seat support mechanism along a second side of the additional car seat center to couple with an adjacent car seat attachment mechanism on a first side of another adjacent car seat. Sometimes at least one set of car seat components is formed as a booster seat having a minimal car seat back or as an integral unit.

Sometimes it includes a second side end attachable to a second side of the first car seat center, and/or least one car seat center back faces at least one other car seat back such that a car seat person seated in one car seat center faces another car seat person seated in another car seat center, and/or at least one car seat base is capable of overlapping another car seat base such that the car seat system uses up a lesser amount of vehicle space width, and/or at least one car seat is a dual car seat providing seating for two car seat persons facing each other within essentially car width space used for a single car seat person, and/or it has at least one seat belt extender to extend the at least one seat belt for use with the car seat system.

Sometimes it includes at least one seat belt extender to extend the at least one seat belt for use with the car seat system, and/or the vehicle is taken from a group of vehicles including: an automobile, a bus, an airplane or a water vehicle.

In some embodiments a car seat system includes a first car seat formed to seat a first person in a vehicle seat made to provide a passenger sitting position within a vehicle, the first car seat employing a first vehicle seat belt for restraining the first car seat in the vehicle, and a first car seat support mechanism, the first car seat support mechanism formed to accept a second car seat attachment mechanism of a second car seat to attach the second car seat to the first car seat. Sometimes the first car seat support mechanism is integral to the first car seat.

Sometimes the car seat system includes a second car seat having the second car seat attachment mechanism. Sometimes the car seat attachment mechanism is integral to the second car seat.

In some cases the car seat system includes a second car seat support mechanism to accept a second car seat attachment mechanism of a third car seat to attach the third car seat to the first car seat. Sometimes the first car seat support mechanism is formed on one side of the first car seat and the second car seat support mechanism is formed on an opposite side of the first car seat, and/or the second car seat has a second car seat support mechanism formed to accept a second car seat attachment mechanism of a third car seat.

Sometimes the first car seat includes a first car seat attachment mechanism to attach the first car seat to a particular support mechanism of another car seat, and/or a plurality of the first car seats, wherein attachment mechanism in each seat of the plurality of first car seats is attachable to any support mechanism of another car seat and/or support mechanism in each seat of the plurality of seats accepts attachment mechanism of another car seat.

In some car seat system embodiments the vehicle has contiguous passenger space width allowed for two persons when the two persons are sitting in the vehicle without any car seat, and the car seat system is formed for seating three persons in the vehicle within the space width allowed for two persons and/or the vehicle has contiguous passenger space width allowed for three persons when the three persons are sitting in the vehicle without any car seat, and the car seat system is formed for seating at least four persons in the vehicle within the space width allowed for three persons.

Sometimes the car seat system provides seating for one or more persons, and at least one sitting positions in the car seat system seats an infant and at least one other sitting position seats an older child. A car seat system s one of: a combination of infant seats, a combination of booster seats and any combination of infant seats and booster seats. An infant is less than two years old an older child is less than 12 years old.

Sometimes any person sitting in one sitting position of the car seat system faces a back of the vehicle and an adjacent person sitting in an adjacent sitting position faces a front of the vehicle.

Sometimes the support mechanism is integral with an attachment mechanism forming a combined mechanism, and the combined mechanism is used to provide one of support for another car seat attachment mechanism or attachment to another car seat.

Sometimes the seat system includes a plurality of car seat bases and at least one car seat base is capable of overlapping a portion of an adjacent car seat base width not used by a person in the adjacent car seat base. In some cases the adjacent seat includes receiving holes capable of accepting wing inserts on the at least one car seat base to provide adjustable mounting of a truncated portion of the at least one car seat to overlap the portion of the adjacent car seat. In some cases it includes at least one separator to separate persons in adjacent car seats.

Furthermore, this invention includes a multiple person car seat that includes: a plurality of car seat person sitting positions to provide seating in a vehicle for a plurality of car seat persons, the multiple person car seat employing at least one seat belt of the vehicle for restraining the multiple person car seat in the vehicle.

In some embodiments of the multiple person car seat the vehicle has contiguous passenger space width allowed for two passengers when the two passengers are sitting in the vehicle without any car seat, and the multiple person car seat is formed for seating three car seat persons in the vehicle within the space width allowed for two regular passengers, and the vehicle has contiguous passenger space width allowed for three regular passengers when the three passengers are sitting in the vehicle without any car seat, and the multiple person car seat formed for seating at least four persons in the vehicle within the space width allowed for three regular passengers.

In some cases the multiple person car seat includes at least one seat belt extender to extend the at least one seat belt for use with the multiple person car seat, and/or at least one sitting position seats an infant and at least one other sitting position seats an older child. In some cases the infant is less than two years old and the older child is less than 12 years old.

In some cases of the multiple person car seat any sitting position that seats an infant provides amenities associated with a vehicle infant seat, and any sitting position that seats the older child provides amenities associated with a vehicle booster seat, and/or any person sitting in one sitting position of the multiple person car seat faces a back of the vehicle and an adjacent person sitting in an adjacent sitting position faces a front of the vehicle. Sometimes one person is an infant and an adjacent person is an older child.

Sometimes the multiple person car seat comprises one of: a combination of infant seats, a combination of booster seats and any combination of infant seats and booster seats.

Sometimes the sitting positions are designed so that one leg of the any person sitting in the one sitting position is capable to be placed between legs placed by the adjacent person, and such that one leg of the adjacent person sitting in the adjacent sitting position is capable to be placed between legs placed by the any person, and/or the sitting positions are designed so that one leg of the any person sitting in the one sitting position is capable to be placed between legs placed by the adjacent person, and such that one leg of the adjacent person sitting in the adjacent sitting position is capable to be placed between legs placed by the any person, and/or the sitting positions are designed so that a pair of legs of the any person sitting in the one sitting position is capable to be placed between another pair of legs placed by the adjacent person.

In some multiple person car seats the sitting positions are designed so that a pair of legs of the any person sitting in the one sitting position is capable to be placed between another pair of legs placed by the adjacent person.

In some car seat systems and/or multiple person car seats, any person sitting in one sitting position of the car seat system faces a back of the vehicle seat and an adjacent person sitting in an adjacent sitting position faces a front of the vehicle seat so that the car seat persons face each other.

In some cases the sitting positions are designed so that a pair of legs of the any person sitting in the one sitting position is capable to be placed between another pair of legs placed by the adjacent person, wherein one person is an infant and the adjacent person is an older child, and/or wherein the infant is less than two years old and the older child is less than 12 years old.

In some embodiments of the multiple person car seat' the vehicle has contiguous passenger space width allowed for two persons when the two persons are sitting in the vehicle without any car seat, and the car seat system is formed for seating two persons in the vehicle generally within space width allowed for one person such that a second passenger is still capable of sitting adjacent to the car seat.

This invention also provides a car seat system that includes: a plurality of car seat centers; a right side car seat end including a car seat support mechanism that is designed to mate with a right side attachment mechanism of a first car seat center from the plurality of car seat centers; a left side car seat end having a left side attachment mechanism designed to mate with a support mechanism of another car seat center from the plurality of car seat centers; wherein each car seat center has an attachment mechanism to attach a support mechanism on the each car seat center on a right side, and a support mechanism to attach an attachment mechanism on the each car seat center on a right side, and wherein each car seat center is attached to another car seat center on a least one side of the each car seat center. Each car seat center comprises at least one of: a car seat base and a car seat back; a dual person car seat, an overlapping car seat; a booster seat, an integral unit of a car seat base and a car seat back; and any combination of these centers.

This invention also provides a car seat entity including a dual person car seat. The dual person car seat includes first car seat for seating a first car seat person and being mountable on a first vehicle seat to take up a first car seat width of a vehicle width in the vehicle seat; a second car seat for seating a second car seat person and being mountable facing the first car seat and being included substantially within and taking up little or no more vehicle width than the first car seat width.

In some cases the second car seat is mounted on a back side of a second vehicle seat being in front of the first vehicle seat, and/or the first and second car seats are components of a car seat system or a multiple person car seat. The bases may be any of the bases described above. and/or is a shape wherein less car width is provided for the car seat user's legs, than is provided for the car seat user's head-ward direction, so that the total car seat system employs less vehicle seat width.

Figure 9:
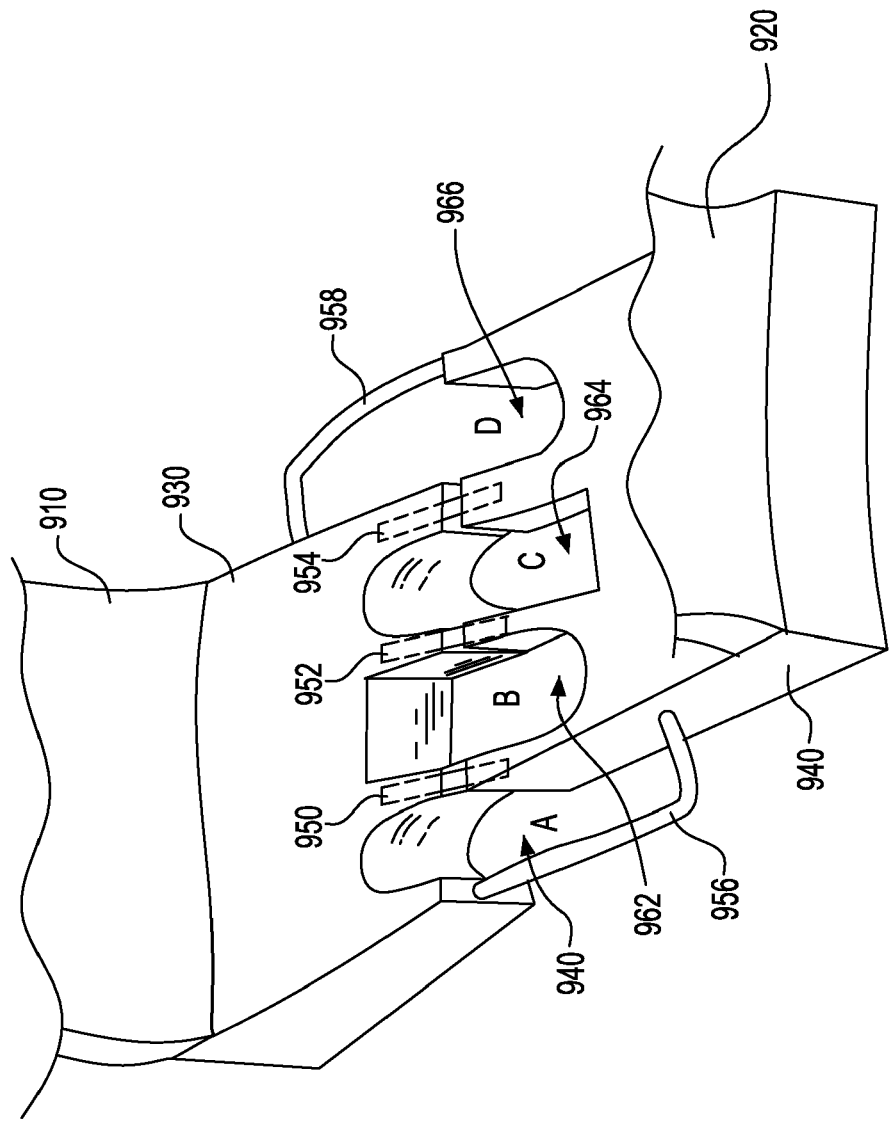
FIG. 9 shows an example embodiment of a car seat adapted to provide two car seat sitting positions 910 and 920 for two adjacent car seat persons sitting facing each other having bases that overlap each other in vehicle space width.

Thus, FIG. 9 shows an example of leg placement when two car seat persons are in adjacent base positions facing each other. As shown, the car seat bases 910 and 940 are mounted to overlap each other in vehicle space width. Car seat base 930 is attached to car seat base 940 with attachment mechanism 950, 952 and 954. In some cases the attachment mechanism includes 956 and 958. When seated, the left leg of each car seat person is placed between the legs of the facing car seat person. This makes advantageous and efficient use of the vehicle's car seat width.

FIGS. 10A, 10B and 10C show an example of car seats 1010, 1020, 1030 that are removably attachable to each other for use in a car seat system for three car seat persons. FIG. 10A shows a car seat 1010 for a front facing infant. FIG. 10B shows a booster car seat 1020 attachable to the right side of car seat 1010. FIG. 10C shows a booster car seat 1030 attachable to the left side of car seat 1010. Booster seat 1020 shows an example of a right side end 1025. Booster seat 1030 shows an example of a left side end 1035.

Figure 11:
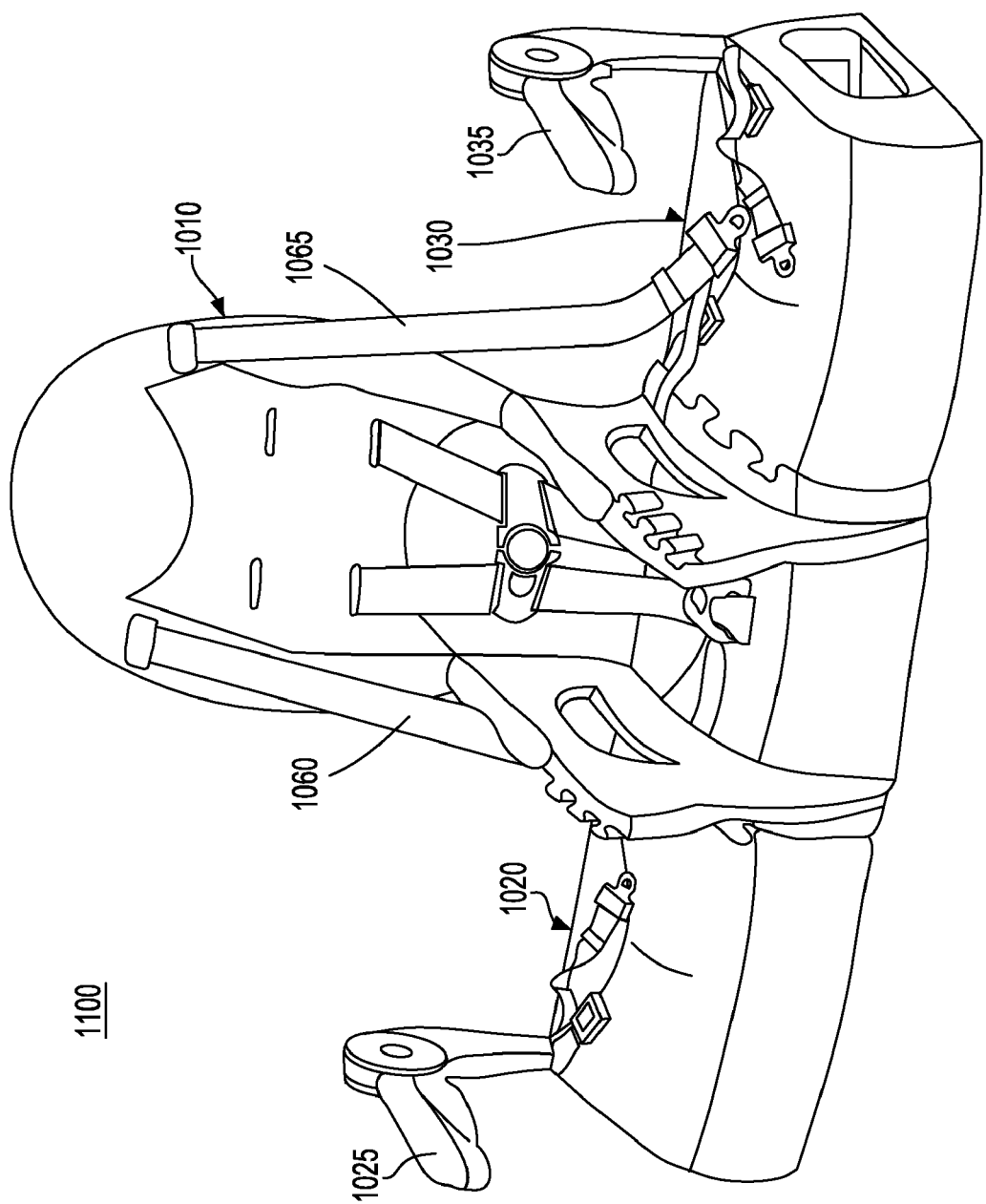
FIG. 11 shows an example combination of a car seat having three seating positions.

FIG. 11 shows 1100 for car seat positions with efficient usage of car vehicle seat space width. It shows an example combination having three seating positions. This may be three seats of a car seat system having seats that are removably attached, or these may be considered to show a multiple car seat for three car seat persons. Belts 1060 and 1065 are an example of a car vehicle belt extender attached to and extending original vehicle seat belts to provide restraint for the car seat system and or the multiple car seat.

Figure 12:
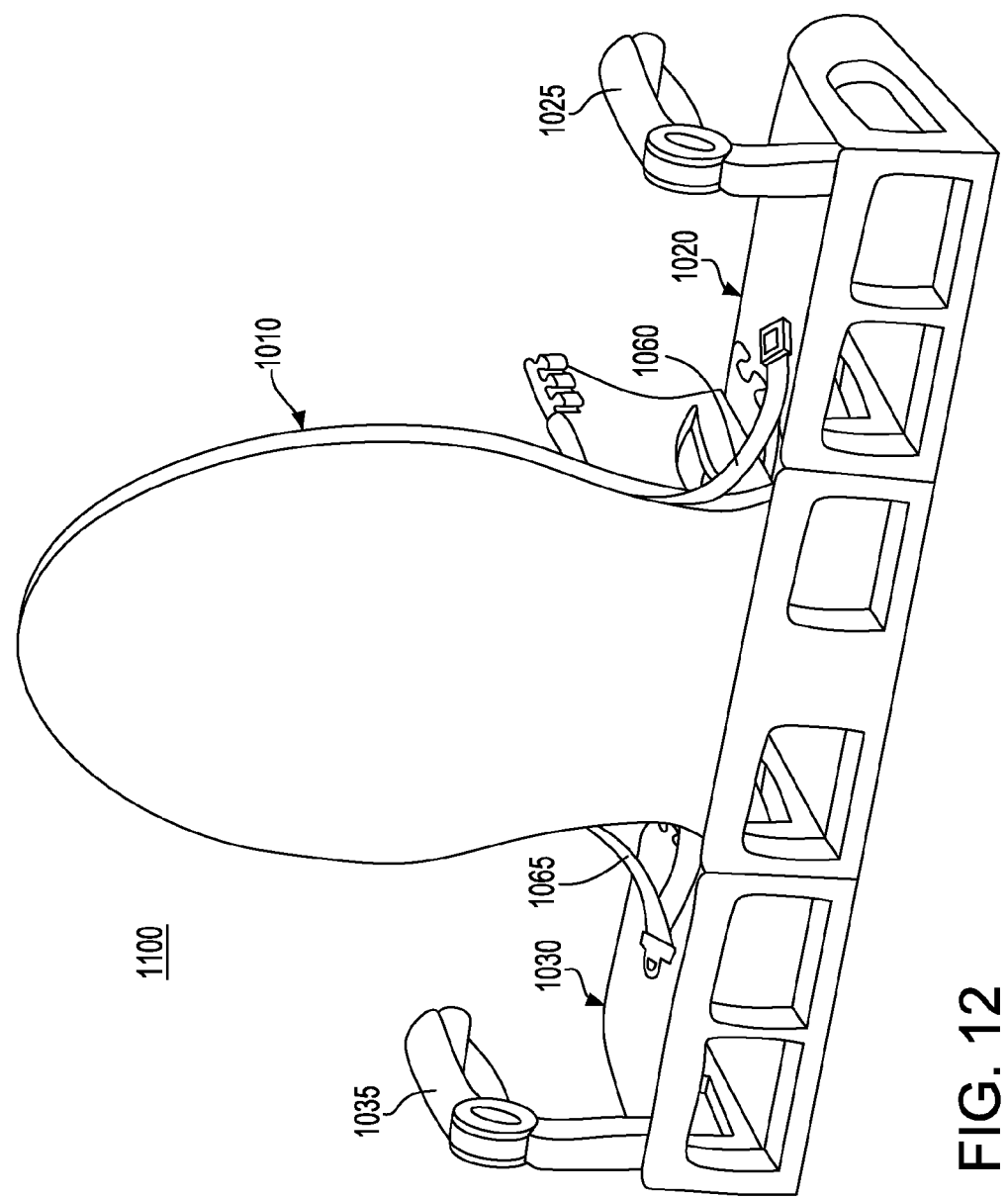
FIG. 12 shows an example of a rear view of the car seat shown in FIG. 11.

FIG. 12 shows an example of a rear view of the car seats shown in FIG. 11. It particularly points out an example of the use of car seat extenders 1060 and 1065 which are attachable to the original vehicle seat belts to restrain seats in a car seat system, or to restrain a multiple car seat.

Although this description uses words like 'car', 'vehicle', 'car seat', etc, it should not be limited by these words. This invention is similarly applicable to seating 'car seat users' in air, water and other land vehicles, etc. The car seat systems and multiple person car seats of this invention are applicable to booster seat and non booster seat combinations. The vehicle of the present invention may be any land vehicle, any air or any water vehicle.

It is noted that the particular implementations described above should only be considered as specific enabling implementations of the concepts and novelties of this invention. Other implementations are also suitable to use the concepts of this invention to obtain the advantages of this invention. This includes locations and types of support and attachment mechanism and/or the separator, the car seat sides, back and bases of car seat centers and/or multiple person car seats, modularity of certain parts, etc. These and other implementations are similarly protected by the claims and concepts of this invention.

What is claimed is:

1. A car seat system comprising a first car seat formed to seat a first car seat person in a vehicle seat, the vehicle seat made to provide at least one sitting position for a passenger in the vehicle, said car seat system being mounted in said vehicle seat employing a built-in seat belt of the vehicle, said first car seat being a first of a plurality of car seats, at least one other car seat of said plurality of car seats is detachably connectable to said first car seat, forming said car seat system, and said first car seat comprising a set of first modular, removably attachable car seat components including:

a first car seat center, comprising:
a first car seat back,
a first car seat base attached to the first car seat back, and
at least one attachment mechanism to attach at least one removably attachable modular component to said first car seat of said car seat system.

2. A car seat system as recited in claim 1, wherein said base is a base taken from a group of bases including:
a trapezoidal base;
a modified trapezoidal base;
an extra wide base;
a base having base overlap capability;
a base pair formed for a dual person car seat; and
a base formed for a dual person car seat having base overlap capability to overlap capability.

3. A car seat system as recited in claim 1, further comprising:
a first side end attachable to a first side of said first car seat center using a portion of said attachment mechanism, and
a first car seat support mechanism mounted on a second side of said first car seat center.

4. A car seat system as recited in claim 3, further comprising a second car seat formed to seat a second car seat person in said vehicle seat, said second car seat comprising a set of second car seat components including:
a second car seat center removably attachable to said second side of said first car seat center along a first side of said second car seat center using another portion of said attachment mechanism, said second car seat center comprising
a second car seat back,
a second car seat base attachable to said second car seat back, and
a second car seat attachment mechanism to couple with said first car seat support mechanism.

5. A car seat system as recited in claim 4, further comprising
a second car seat end attachable to said second car seat center along a second side of said second car seat, wherein said second car seat is attached to said first car seat, and said second car seat attachment mechanism is coupled with said first car seat support mechanism to provide car seat seating for two car seat persons.

6. A car seat system as recited in claim 5, further comprising at least one additional car seat comprising an additional car seat center, each additional car seat center being removably attachable to the car seat system, and comprising:
- an additional car seat back;
- an additional car seat base attachable to said additional car seat back;
- an additional car seat attachment mechanism along a first side of said additional car seat center to couple with an adjacent car seat support mechanism on a second side of an adjacent car seat; and
- an additional car seat support mechanism along a second side of said additional car seat center to couple with an adjacent car seat attachment mechanism on a first side of another adjacent car seat.

7. A car seat system as recited in claim 6, wherein at least one car seat center back faces at least one other car seat back such that a car seat person seated in one car seat center faces another car seat person seated in another car seat center.

8. A car seat system as recited in claim 6, wherein at least one car seat is a dual car seat providing seating for two car seat persons facing each other within essentially car width space used for a single car seat person.

9. A car seat system as recited in claim 6, further comprising at least one seat belt extender to extend said at least one seat belt for use with said car seat system.

10. A car seat system as in claim 6, further comprising at least one separator to separate at least two car seat persons in adjacent car seats.

11. A car seat system as recited in claim 6, wherein at least one set of car seat components is formed as one of: a booster seat having a minimal car seat back and an integral car seat unit.

12. A car seat system as recited in claim 3, further comprising a second side end removably attachable to a second side of said first car seat center.

13. A car seat system comprising a first car seat formed to seat a first car seat person in a vehicle seat, the vehicle seat made to provide at least one sitting position for a passenger in the vehicle, said car seat system being mounted in said vehicle seat employing a built-in seat belt of the vehicle, said first car seat comprising a set of first car seat components including:
- a first car seat center, comprising
  - a first car seat back, and
  - a first car seat base that is able to be attached to the first car seat back, and further comprising:
- a first side end attachable to a first side of said first car seat center, and
- a first car seat support mechanism mounted on a second side of said first car seat center,
- a second car seat formed to seat a second car seat person in said vehicle seat, said second car seat comprising a set of second car seat components including:
- a second car seat center attachable to said second side of said first car seat center along a first side of said second car seat center, said second car seat center comprising
  - a second car seat back,
  - a second car seat base attachable to said second car seat back, and
- a second car seat attachment mechanism to couple with said first car seat support mechanism,
- a second car seat end attachable to said second car seat center along a second side of said second car seat, wherein said second car seat is attached to said first car seat, and said second car seat attachment mechanism is coupled with said first car seat support mechanism to provide car seat seating for two car seat persons,
- at least one additional car seat comprising an additional car seat center, each additional car seat center comprising:
  - an additional car seat back;
  - an additional car seat base attachable to said additional car seat back;
- an additional car seat attachment mechanism along a first side of said additional car seat center to couple with an adjacent car seat support mechanism on a second side of an adjacent car seat;
- an additional car seat support mechanism along a second side of said additional car seat center to couple with an adjacent car seat attachment mechanism on a first side of another adjacent car seat,
wherein at least one car seat base is capable of overlapping another car seat base such that the car seat system uses up a lesser amount of vehicle space width.

14. A car seat system as recited in claim 1, wherein the vehicle is taken from a group of vehicles consisting of: an air or a water vehicle.

15. A car seat system comprising:
- a first car seat formed to seat a first car seat person in a vehicle seat made to provide a regular passenger sitting position within a vehicle, said first car seat being a first of a plurality of car seats forming said car seat system, at least one other car seat of said plurality of car seats is detachably connectable to said first car seat, and employing a first vehicle seat belt for restraining said first car seat in said vehicle; and
- a first car seat support mechanism, said first car seat support mechanism formed to attach a second car seat attachment mechanism of a second car seat to detachably connect said second car seat to said first car seat on a first side of said first car seat.

16. A car seat system as recited in claim 15, further comprising: a second car seat being a second of said plurality of car seats forming said car seat system, and having said second car seat attachment mechanism.

17. A car seat system as recited in claim 16, wherein said first car seat support mechanism is formed on one side of said first car seat and said second car seat support mechanism is formed on an opposite side of said first car seat.

18. A car seat system as recited in claim 16, wherein said second car seat comprises a second car seat support mechanism formed to accept a second car seat attachment mechanism of a third car seat.

19. A car seat system as recited in claim 15, further comprising: a second car seat support mechanism to accept a second car seat attachment mechanism of a third car seat to attach said third car seat to said first car seat on a second side of said first car seat.

20. A car seat system as recited in claim 15, comprising a first car seat attachment mechanism to attach said first car seat to a particular support mechanism of another car seat.

21. A car seat system as recited in claim 20, further comprising a plurality of said first car seats, wherein any attachment mechanism in each seat of said plurality of first car seats is attachable to at least one support mechanism of another car seat, and/or any support mechanism in each seat of said plurality of seats accepts at least one attachment mechanism of another car seat.

22. A car seat system as recited in claim 21, wherein said vehicle has contiguous passenger space width allowed for two regular passengers when said two regular passengers are sitting in said vehicle without any car seat, and said car seat system is formed for seating three car seat persons in said vehicle within said space width provided for said two regular passengers.

23. A car seat system as recited in claim 21, wherein said vehicle has contiguous passenger space width allowed for three regular passengers when said three regular passengers are sitting in said vehicle without any car seat, and said car seat system is formed for seating at least four persons in said vehicle within said space width provided for three regular passengers.

24. A car seat system as recited in claim 21, wherein each car seat provides seating for one car seat person, and wherein at least one sitting position in said car seat system seats an infant and at least one other sitting position seats an older child.

25. A car seat system as recited in claim 24, wherein said infant is less than two years old and said older child is less than 12 years old.

26. A car seat system as recited in claim 24, wherein any person sitting in one sitting position of said car seat system faces a back of said vehicle and an adjacent person sitting in an adjacent sitting position faces a front of said vehicle.

27. A car seat system as recited in claim 26, wherein said car seat system is adapted to provide sitting positions so that one leg of said any person facing the back of said vehicle seat is capable to be placed between legs of said adjacent person sitting in an adjacent sitting position facing the front of said vehicle seat.

28. A car seat system as recited in claim 21, wherein said car seat system comprises one of: a combination of infant seats, a combination of booster seats and any combination of infant seats and booster seats.

29. A car seat system as recited in claim 21, wherein any person sitting in one sitting position of said car seat system faces a back of said vehicle and an adjacent person sitting in an adjacent sitting position faces a front of said vehicle.

30. A multiple person car seat as in claim 21, further comprising at least one separator to separate at least two car seat persons in adjacent car seats.

31. A car seat system as recited in claim 15, further comprising at least one seat belt extender to extend said at least one seat belt for use with said car seat system.

32. A car seat system as recited in claim 15, wherein the vehicle is taken from a group of vehicles consisting of: an air and a water vehicle.

33. A multiple person car seat comprising:
a plurality of car seat person sitting positions to provide seating in a vehicle seat for a plurality of car seat persons, said multiple person car seat comprises one of:
a combination of infant seats, a combination of booster seats and any combination of infant seats and booster seats,
said multiple person car seat being self contained and employing at least one seat belt of said vehicle for restraining at least one of:
at least one car seat person of said plurality of car seat persons in at least one of said car seat person sitting positions, and
said multiple person car seat.

34. A multiple person car seat as recited in claim 33, wherein said vehicle has contiguous passenger space width allowed for two regular passengers when said two regular passengers are sitting in said vehicle without any car seat, and said multiple person car seat is formed for seating three car seat persons in said vehicle substantially within said space width allowed for two regular passengers.

35. A multiple person car seat as recited in claim 33, wherein said vehicle has contiguous passenger space width allowed for three regular passengers when said three regular passengers are sitting in said vehicle without any car seat, and said multiple person car seat is formed for seating at least four persons in said vehicle within said space width allowed for three regular passenger.

36. A multiple person car seat as recited in claim 33, further comprising at least one seat belt extender to extend said at least one seat belt for use with said multiple person car seat.

37. A multiple person car seat as recited in claim 33, wherein at least one sitting position seats an infant and at least one other sitting position seats an older child.

38. A multiple person car seat as recited in claim 37, wherein said infant is less than two years old and said older child is less than 12 years old.

39. A multiple person car seat as recited in claim 37, wherein any sitting position that seats an infant provides amenities associated with a vehicle infant seat, and any sitting position that seats said older child provides amenities associated with a vehicle booster seat.

40. A multiple person car seat as recited in claim 33, wherein at least one car seat person sitting in one sitting position of said multiple person car seat faces a back of said vehicle seat, and an adjacent car seat person sitting in an adjacent sitting position faces a front of said vehicle seat.

41. A multiple person car seat as recited in claim 40, wherein said multiple person car seat is adapted to provide sitting positions so that one leg of said at least one car seat person facing the back of said vehicle seat is capable to be placed between legs of said adjacent person sitting in an adjacent sitting position facing the front of said vehicle seat.

42. A multiple person car seat as recited in claim 40, wherein said multiple person car seat system is adapted to provide sitting positions so that a leg of said any person sitting in said one sitting position facing the back of said vehicle seat is capable to be placed between legs of said adjacent person facing the front of said vehicle seat.

43. A multiple person car seat as recited in claim 40, wherein said vehicle has contiguous passenger space width allowed for two persons when said two persons are sitting in said vehicle without any car seat, and said car seat system is formed for seating two persons in said vehicle generally within space width allowed for one person such that a second passenger is still capable of sitting adjacent to the car seat.

44. A multiple person car seat as recited in claim 33, wherein the vehicle is taken from a group of vehicles consisting of:
an air, and
a water vehicle.

45. A multiple person car seat as recited in claim 33, wherein said multiple person car seat comprises one of:
a combination of infant seats,
a combination of seats with differing seat bases,
a combination of booster seats, and
any combination of the combinations listed above.

46. A car seat system comprising:
a plurality of car seat centers, at least one other car seat center of said plurality of car seat centers is detachably connectable to said first car seat center, each of said car seat centers being removably attachable to at least one other car seat center;
a right side car seat end including a car seat support mechanism designed to mate with a right side attachment mechanism of a first car seat center from said plurality of car seat centers; and a left side car seat end having a left side attachment mechanism designed to mate with a support mechanism of another car seat center from said plurality of car seat centers, wherein each car seat center has an attachment mechanism to attach a support mechanism on said each car seat center on a right side, and a support mechanism to attach an attachment mechanism on said each car seat center on a right side, and wherein each car seat center is attached to another car seat center on a least one side of said each car seat center.

47. A car seat system, comprising:
   a plurality of car seat centers;
   a right side car seat end including a car seat support mechanism designed to mate with a right side attachment mechanism of a first car seat center from said plurality of car seat centers; and
   a left side car seat end having a left side attachment mechanism designed to mate with a support mechanism of another car seat center from said plurality of car seat centers,
wherein each car seat center has an attachment mechanism to attach a support mechanism on said each car seat center on a right side, and a support mechanism to attach an attachment mechanism on said each car seat center on a right side, and wherein each car seat center is attached to another car seat center on a least one side of said each car seat center, and wherein each car seat center comprises at least one of:
   a car seat base and a car seat back;
   a dual person car seat,
   an overlapping car seat;
   a booster seat
   an integral unit of a car seat base and a car seat back; and
   any combination of these.

48. A car seat entity comprising a dual person car seat, said dual person car seat comprising:
   a first car seat for seating a first car seat person and being mountable on a first vehicle seat to take up a first car seat width of a vehicle width in said vehicle seat;
   a second car seat for seating a second car seat person and being mountable facing said first car seat and being included substantially within a same vehicle width space taken up by said first car seat width.

49. A car seat entity as recited in claim 48, wherein said second car seat is mounted on a back side of a second vehicle seat being in front of said first vehicle seat.

50. A car seat entity as recited in claim 48, wherein said first and second car seats are components of a car seat system.

51. A car seat entity as recited in claim 48, wherein said first and second car seats are formed within a multiple person car seat.

52. A car seat system as in claim 47, wherein said car seat base is one of:
   a rectangular base;
   a trapezoidal base;
   a modified trapezoidal base;
   an extra wide base;
   a base having base overlap capability;
   a base pair formed for a dual person car seat;
   a base having base overlap capability to overlap another base;
   a booster seat base with a minimal back;
   a booster seat base; and
   any combination of these bases.

53. A car seat system as in claim 47, having a plurality of car seat bases wherein at least one car seat base is capable of overlapping a portion of base width of an adjacent car seat base but not used by the car seat person in said adjacent car seat base.

54. A car seat system as in claim 47, wherein said adjacent seat includes receiving holes capable of accepting wing inserts on said at least one car seat base to provide adjustable mounting of a truncated portion of said at least one car seat to overlap said truncated portion of said adjacent car seat.

55. A car seat system as in claim 47, further comprising at least one separator to separate at least two car seat persons in adjacent car seat centers.

56. A car seat system comprising:
   a first car seat being a first of a plurality of car seats, wherein at least one other car seat of said plurality of car seats is detachably connectable to said first car seat, forming said car seat system, and said first car of said first car seat comprising a set of first modular, removably attachable car seat components including:
      a first car seat right end,
      a first car seat left end, and
      a first car seat center,
   wherein the first car seat center includes a first car seat back and a first car seat base, said first car seat right end including a support mechanism to attach an attachment mechanism of a right periphery of the first car seat center, and wherein a left periphery of the first car seat center includes a support mechanism to attach an attachment mechanism of the first car seat left end when the system is used for a single person.

57. A car seat system as in claim 56, wherein:
   when the car seat system is used for two persons, the support mechanism of the left periphery of the first car seat center accepts an attachment mechanism of a second car seat right end,
   when the car seat system is used for three persons, the support mechanism of the left periphery of the second car seat center accepts an attachment mechanism of a third car seat right end, and
   the support mechanism of the left most car seat center accepts an attachment mechanism of the first car seat right end.

58. A car seat system as in claim 57, further comprising at least one separator to separate car seat centers, and the car seat system employs at least one adult seat belt male and female connector combination of the vehicle.

59. A car seat system as in claim 57, wherein the second car seat center employs at least one of:
   a seat belt of the vehicle;
   a same seat belt employed by the first car seat;
   a seat belt extender to properly restrain the first and second car seats; and
   a special seat belt for each car seat to restrain a particular person in said each car seat.

60. A car seat system as in claim 59, wherein at least one car seat center has curled sides to support a particular person in said at least one car seat center.

61. A car seat system as in claim 57, further comprising at least one additional car seat center attached between said first and second car seats.

* * * * *

UNITED STATES PATENT AND TRADEMARK OFFICE
CERTIFICATE OF CORRECTION

| | | |
|---|---|---|
| PATENT NO. | : 7,883,149 B1 | |
| APPLICATION NO. | : 12/701186 | |
| DATED | : February 8, 2011 | |
| INVENTOR(S) | : Isaac Weiss et al. | |

It is certified that error appears in the above-identified patent and that said Letters Patent is hereby corrected as shown below:

Col. 18 Lines 10-67 through Col. 24; claims should be deleted and replaced with attached claims 1-61 on pages 2-15.

Signed and Sealed this

Seventeenth Day of May, 2011

David J. Kappos
*Director of the United States Patent and Trademark Office*

What is claimed is:

1. A car seat system comprising a first car seat formed to seat a first car seat person in a vehicle seat, the vehicle seat made to provide at least one sitting position for a passenger in the vehicle, said car seat system being mounted in said vehicle seat employing a built-in seat belt of the vehicle, said first car seat being a first of a plurality of car seats, at least one other car seat of said plurality of car seats is detachably connectable to said first car seat, forming said car seat system, and said first car seat comprising a set of first modular, removably attachable car seat components including:

a first car seat center, comprising:

a first car seat back, a first car seat base attached to the first car seat back, and at least one attachment mechanism to attach at least one removably attachable modular component to said first car seat of said car seat system.

2. A car seat system as recited in claim 1, wherein said base is a base taken from a group of bases including:

a rectangular base;

a trapezoidal base;

a modified trapezoidal base;

an extra wide base;

a base having base overlap capability;

a base pair formed for a dual person car seat; and a base formed for a dual person car seat having base overlap capability.

3. A car seat system as recited in claim 1, further comprising:

a first side end attachable to a first side of said first car seat center using a portion of said attachment mechanism, and a first car seat support mechanism mounted on a second side of said first car seat center.

4. A car seat system as recited in claim 3, further comprising a second car seat formed to seat a second car seat person in said vehicle seat, said second car seat comprising a set of second car seat components including:

a second car seat center removably attachable to said second side of said first car seat center along a first side of said second car seat center using another portion of said attachment mechanism, said second car seat center comprising a second car seat back, a second car seat base attachable to said second car seat back, and a second car seat attachment mechanism to couple with said first car seat support mechanism.

5. A car seat system as recited in claim 4, further comprising a second car seat end attachable to said second car seat center along a second side of said second car seat, wherein said second car seat is attached to said first car seat, and said second car seat attachment mechanism is coupled with said first car seat support mechanism to provide car seat seating for two car seat persons.

6. A car seat system as recited in claim 5, further comprising at least one additional car seat comprising an additional car seat center, each additional car seat center being removably attachable to the car seat system, and comprising:

an additional car seat back;

an additional car seat base attachable to said additional car seat back;

an additional car seat attachment mechanism along a first side of said additional car seat center to couple with an adjacent car seat support mechanism on a second side of an adjacent car seat; and an additional car seat support mechanism along a second side of said additional car seat center to couple with an adjacent car seat attachment mechanism on a first side of another adjacent car seat.

7. A car seat system as recited in claim 6, wherein at least one set of car seat components is formed as one of: a booster seat having a minimal car seat back and an integral car seat unit.

8. A car seat system as recited in claim 3, further comprising a second side end removably attachable to a second side of said first car seat center.

9. A car seat system as recited in claim 6, wherein at least one car seat center back faces at least one other car seat back such that a car seat person seated in one car seat center faces another car seat person seated in another car seat center.

10. A car seat system comprising a first car seat formed to seat a first car seat person in a vehicle seat, the vehicle seat made to provide at least one sitting position for a passenger in the vehicle, said car seat system being mounted in said vehicle seat employing a built-in seat belt of the vehicle, said first car seat comprising a set of first car seat components including:

a first car seat center, comprising a first car seat back, and a first car seat base that is able to be attached to the first car seat back, and further comprising:

a first side end attachable to a first side of said first car seat center, and a first car seat support mechanism mounted on a second side of said first car seat center, a second car seat formed to seat a second car seat person in said vehicle seat, said second car seat comprising a set of second car seat components including:

a second car seat center attachable to said second side of said first car seat center along a first side of said second car seat center, said second car seat center comprising a second car seat back, a second car seat base attachable to said second car seat back, and a second car seat attachment mechanism to couple with said first car seat support mechanism, a second car seat end attachable to said second car seat center along a second side of said second car seat, wherein said second car seat is attached to said first car seat, and said second car seat attachment mechanism is coupled with said first car seat support mechanism to provide car seat seating for two car seat persons, at least one additional car seat comprising an additional car seat center, each additional car seat center comprising:

an additional car seat back;

an additional car seat base attachable to said additional car seat back;

an additional car seat attachment mechanism along a first side of said additional car seat center to couple with an adjacent car seat support mechanism on a second side of an adjacent car seat;

an additional car seat support mechanism along a second side of said additional car seat center to couple with an adjacent car seat attachment mechanism on a first side of another adjacent car seat, wherein at least one car seat base is capable of overlapping another car seat base such that the car seat system uses up a lesser amount of vehicle space width.

11. A car seat system as recited in claim 6, wherein at least one car seat is a dual car seat providing seating for two car seat persons facing each other within essentially car width space used for a single car seat person.

12. A car seat system as recited in claim 6, further comprising at least one seat belt extender to extend said at least one seat belt for use with said car seat system.

13. A car seat system as recited in claim 1, wherein the vehicle is taken from a group of vehicles consisting of: a land, an air or a water vehicle.

14. A car seat system comprising:
    a first car seat formed to seat a first car seat person in a vehicle seat made to provide a regular passenger sitting position within a vehicle, said first car seat being a first of a plurality of car seats forming said car seat system, at least one other car seat of said plurality of car seats is detachably connectable to said first car seat, and employing a first vehicle seat belt for restraining said first car seat in said vehicle; and
    a first car seat support mechanism adapted to detachably receive at least one of the plurality of car seats, said first car seat support mechanism formed to attach a second car seat attachment mechanism of a second car seat to detachably connect said second car seat to said first car seat on a first side of said first car seat.

15. A car seat system as recited in claim 14, further comprising: a second car seat being a second of said plurality of car seats forming said car seat system, and having said second car seat attachment mechanism.

16. A car seat system as recited in claim 14, further comprising: a second car seat support mechanism to accept a second car seat attachment mechanism of a third car seat to attach said third car seat to said first car seat on a second side of said first car seat.

17. A car seat system as recited in claim 15, wherein said first car seat support mechanism is formed on one side of said first car seat and said second car seat support mechanism is formed on an opposite side of said first car seat.

18. A car seat system as recited in claim 15, wherein said second car seat comprises a second car seat support mechanism formed to accept a second car seat attachment mechanism of a third car seat.

19. A car seat system as recited in claim 14, comprising a first car seat attachment mechanism to attach said first car seat to a particular support mechanism of another car seat.

20. A car seat system as recited in claim 19, further comprising a plurality of said first car seats, wherein any attachment mechanism in each seat of said plurality of first car seats is attachable to at least one support mechanism of another car seat, and/or any support mechanism in each seat of said plurality of seats accepts at least one attachment mechanism of another car seat.

21. A car seat system as recited in claim 14, further comprising at least one seat belt extender to extend said at least one seat belt for use with said car seat system.

22. A car seat system as recited in claim 20, wherein said vehicle has contiguous passenger space width allowed for two regular passengers when said two regular passengers are sitting in said vehicle without any car seat, and said car seat system is formed for seating three car seat persons in said vehicle within said space width provided for said two regular passengers.

23. A car seat system as recited in claim 20, wherein said vehicle has contiguous passenger space width allowed for three regular passengers when said three regular passengers are sitting in said vehicle without any car seat, and said car seat system is formed for seating at least four persons in said vehicle within said space width provided for three regular passengers.

24. A car seat system as recited in claim 20, wherein each car seat provides seating for one car seat person, and wherein at least one sitting position in said car seat system seats an infant and at least one other sitting position seats an older child.

25. A car seat system as recited in claim 24, wherein said infant is less than two years old and said older child is less than 12 years old.

26. A car seat system as recited in claim 24, wherein any person sitting in one sitting position of said car seat system faces a back of said vehicle and an adjacent person sitting in an adjacent sitting position faces a front of said vehicle.

27. A car seat system as recited in claim 14, wherein the vehicle is taken from a group of vehicles consisting of: a land, an air and a water vehicle.

28. A car seat system as recited in claim 20, wherein said car seat system comprises one of: a combination of infant seats, a combination of booster seats and any combination of infant seats and booster seats.

29. A multiple person car seat comprising:
   a plurality of car seat person sitting positions to provide seating in a vehicle seat for a plurality of car seat persons, said multiple person car seat comprises one of:
   a combination of infant seats, a combination of booster seats and any combination of infant seats and booster seats,
   said multiple person car seat being self contained and integrally constructed as a single unit and employing at least one seat belt of said vehicle for restraining at least one of:
   at least one car seat person of said plurality of car seat persons in at least one of said car seat person sitting positions, and
   said multiple person car seat.

30. A multiple person car seat as recited in claim 29, wherein said vehicle has contiguous passenger space width allowed for two regular passengers when said two regular passengers are sitting in said vehicle without any car seat, and said multiple person car seat is formed for seating three car seat persons in said vehicle substantially within said space width allowed for two regular passengers.

31. A multiple person car seat as recited in claim 29, wherein said vehicle has contiguous passenger space width allowed for three regular passengers when said three regular passengers are sitting in said vehicle without any car seat, and said multiple person car seat is formed for seating at least four persons in said vehicle within said space width allowed for three regular passenger.

32. A multiple person car seat as recited in claim 29, further comprising at least one seat belt extender to extend said at least one seat belt for use with said multiple person car seat.

33. A multiple person car seat as recited in claim 29, wherein at least one sitting position seats an infant and at least one other sitting position seats an older child.

34. A multiple person car seat as recited in claim 33, wherein said infant is less than two years old and said older child is less than 12 years old.

35. A multiple person car seat as recited in claim 33, wherein any sitting position that seats an infant provides amenities associated with a vehicle infant seat, and any sitting position that seats said older child provides amenities associated with a vehicle booster seat.

36. A multiple person car seat as recited in claim 29, wherein at least one car seat person sitting in one sitting position of said multiple person car seat faces a back of said vehicle seat, and an adjacent car seat person sitting in an adjacent sitting position faces a front of said vehicle seat.

37. A multiple person car seat as recited in claim 29, wherein the vehicle is taken from a group of vehicles consisting of:
    a land vehicle,
    an air vehicle, and
    a water vehicle.

38. A multiple person car seat as recited in claim 29, wherein said multiple person car seat comprises one of:
    a combination of infant seats,
    a combination of seats with differing seat bases,
    a combination of booster seats, and
    any combination of the combinations listed above.

39. A multiple person car seat as recited in claim 36, wherein said multiple person car seat is adapted to provide sitting positions so that one leg of said at least one car seat person facing the back of said vehicle seat is capable to be placed between legs of said adjacent person sitting in an adjacent sitting position facing the front of said vehicle seat.

40. A car seat system as recited in claim 26, wherein said car seat system is adapted to provide sitting positions so that one leg of said any person facing the back of said vehicle seat is capable to be placed between legs of said adjacent person sitting in an adjacent sitting position facing the front of said vehicle seat.

41. A multiple person car seat as recited in claim 36, wherein said multiple person car seat system is adapted to provide sitting positions so that a leg of said any person sitting in said one sitting position facing the back of said vehicle seat is capable to be placed between legs of said adjacent person facing the front of said vehicle seat.

42. A car seat system as recited in claim 20, wherein any person sitting in one sitting position of said car seat system faces a back of said vehicle and an adjacent person sitting in an adjacent sitting position faces a front of said vehicle.

43. A multiple person car seat as recited in claim 36, wherein said vehicle has contiguous passenger space width allowed for two persons when said two persons are sitting in said vehicle without any car seat, and said car seat system is formed for seating two persons in said vehicle generally within space width allowed for one person such that a second passenger is still capable of sitting adjacent to the car seat.

44. A car seat system comprising:
    a first car seat center from a plurality of car seat centers, at least one other car seat center of said plurality of car seat centers is detachably connectable to said first car seat center, each of said car seat centers being removably attachable to at least one other car seat center;
    a support mechanism adapted to detachably receive at least one of the plurality car seat centers;
    a right side car seat end including a car seat support mechanism designed to mate with a right side attachment mechanism of a first car seat center from said plurality of car seat centers; and a left side car seat end having a left side attachment mechanism designed to mate with a support mechanism of another car seat center from said plurality of car seat centers, wherein each car seat center has an attachment mechanism to attach a support mechanism on said each car seat center on a right side, and a support mechanism to attach an attachment mechanism on said each car seat center on a right side, and wherein each car seat center is attached to another car seat center on a least one side of said each car seat center.

45. A car seat system comprising:
    a plurality of car seat centers;
    a right side car seat end including a car seat support mechanism designed to mate with a right side attachment mechanism of a first car seat center from said plurality of car seat centers; and
    a left side car seat end having a left side attachment mechanism designed to mate with a support mechanism of another car seat center from said plurality of car seat centers, wherein each car seat center has an attachment mechanism to attach a support mechanism on said each car seat center on a right side, and a support mechanism to attach an attachment mechanism on said each car seat center on a right side, and wherein each car seat center is attached to another car seat center on a least one side of said each car seat center, and wherein each car seat center comprises at least one of:
    a car seat base and a car seat back;
    a dual person car seat,
    an overlapping car seat;
    a booster seat
    an integral unit of a car seat base and a car seat back; and
    any combination of these.

46. A car seat entity comprising a dual person car seat, said dual person car seat comprising:
    a first car seat for seating a first car seat person and being mountable on a first vehicle seat to take up a first car seat width of a vehicle width in said vehicle seat;

a second car seat for seating a second car seat person and being mountable facing said first car seat and being included substantially within a same vehicle width space taken up by said first car seat width.

47. A car seat entity as recited in claim 46, wherein said second car seat is mounted on a back side of a second vehicle seat being in front of said first vehicle seat.

48. A car seat entity as recited in claim 46, wherein said first and second car seats are components of a car seat system.

49. A car seat entity as recited in claim 46, wherein said first and second car seats are formed within a multiple person car seat.

50. A car seat system as in claim 45, wherein said car seat base is one of:
    a rectangular base;
    a trapezoidal base;
    a modified trapezoidal base;
    an extra wide base;
    a base having base overlap capability;
    a base pair formed for a dual person car seat;
    a base having base overlap capability to overlap another base;
    a booster seat base with a minimal back;
    a booster seat base; and
    any combination of these bases.

51. A car seat system as in claim 45, having a plurality of car seat bases wherein at least one car seat base is capable of overlapping a portion of base width of an adjacent car seat base but not used by the car seat person in said adjacent car seat base.

52. A car seat system as in claim 45, wherein said adjacent seat includes receiving holes capable of accepting wing inserts on said at least one car seat base to provide adjustable mounting of a truncated portion of said at least one car seat to overlap said truncated portion of said adjacent car seat.

53. A car seat system as in claim 45, further comprising at least one separator to separate at least two car seat persons in adjacent car seat centers.

54. A multiple person car seat as in claim 20, further comprising at least one separator to separate at least two car seat persons in adjacent car seats.

55. A car seat system as in claim 6, further comprising at least one separator to separate at least two car seat persons in adjacent car seats.

56. A car seat system comprising:
a first car seat being a first of a plurality of car seats, wherein at least one other car seat of said plurality of car seats is detachably connectable to said first car seat, forming said car seat system, and said first car seat of said first car seat system comprising a set of first car seat components including:
      a first car seat right end,
      a first car seat left end, and
      a first car seat center,
wherein the first car seat center includes a first car seat back, and, a first car seat base, said first car seat right end including a support mechanism to attach an attachment mechanism of a right periphery of the first car seat center, and wherein a left periphery of the first car seat center includes a support mechanism to attach an attachment mechanism of the first car seat left end when the system is used for a single person.

57. A car seat system as in claim 56, wherein:

when the car seat system is used for two persons, the support mechanism of the left periphery of the first car seat center accepts an attachment mechanism of a second car seat right end,
when the car seat system is used for three persons, the support mechanism of the left periphery of the second car seat center accepts an attachment mechanism of a third car seat right end, and
the support mechanism of the left most car seat center accepts an attachment mechanism of the first car seat right end.

58. A car seat system as in claim 57, further comprising at least one separator to separate car seat centers, and the car seat system employs at least one adult seat belt male and female connector combination of the vehicle.

59. A car seat system as in claim 57, wherein the second car seat center employs at least one of:

- a seat belt of the vehicle;
- a same seat belt employed by the first car seat;
- a seat belt extender to properly restrain the first and second car seats; and
- a special seat belt for each car seat to restrain a particular person in said each car seat.

60. A car seat system as in claim 57, further comprising at least one additional car seat center attached between said first and second car seats.

61. A car seat system as in claim 59, wherein at least one car seat center has curled sides to support a particular person in said at least one car seat center.